US012623630B2

(12) United States Patent (10) Patent No.: US 12,623,630 B2
Carlsson et al. (45) Date of Patent: May 12, 2026

(54) CONTROLLING ACCESS OF A VEHICLE BASED ON LOCAL CLOCK TIMINGS AND A DIGITAL KEY INTERFACE

(71) Applicant: Volvo Car Corporation, Gothenburg (SE)

(72) Inventors: Christoffer Carlsson, Gothenburg (SE); Alfons Massey, Trollhättan (SE)

(73) Assignee: Volvo Car Corporation, Gothenburg (SE)

( * ) Notice: Subject to any disclaimer, the term of this patent is extended or adjusted under 35 U.S.C. 154(b) by 31 days.

(21) Appl. No.: 18/444,108

(22) Filed: Feb. 16, 2024

(65) Prior Publication Data

US 2025/0263044 A1 Aug. 21, 2025

(51) Int. Cl.
B60R 25/24 (2013.01)
B60R 25/01 (2013.01)
(Continued)

(52) U.S. Cl.
CPC .............. B60R 25/24 (2013.01); B60R 25/01 (2013.01); G07C 9/00309 (2013.01);
(Continued)

(58) Field of Classification Search
CPC ..... B60R 25/24; B60R 25/01; G07C 9/00309; G07C 2209/08; H04L 9/0825; H04L 2209/84
See application file for complete search history.

(56) References Cited

U.S. PATENT DOCUMENTS 8,943,187 B1 1/2015 Saylor
10,202,100 B1 2/2019 Tucker et al.
(Continued)

FOREIGN PATENT DOCUMENTS

DE 102015103329 A1 9/2016
DE 102017113646 A1 12/2018
WO 2022162982 A1 8/2022

OTHER PUBLICATIONS

Wardlaw "What is a Digital Key for a Car?" J.D. Power [/] Nov. 16, 2020. 10 pages.
(Continued)

*Primary Examiner* — Vernal U Brown
(74) *Attorney, Agent, or Firm* — Amin, Turocy & Watson, LLP

(57) ABSTRACT
Various systems and methods are presented regarding controlling access to a vehicle. Access of the vehicle, by a second device, can be controlled by a first device utilizing authentication keys, access duration, and/or generation of access confirmations and access revocations. Respective timing of operations can be based on one or more timings generated by a real-time clock located on the vehicle. Further, in the event of an access confirmation not being received from the first device at a defined time, access of the second vehicle can be revoked. Communications between the respective devices can utilize short-range wireless communications. Access to the vehicle can be via controlling a digital/electronic interface, which can be further connected to a smart key configured to control operation of a vehicle door, engine/motor, and suchlike. The first device and the second device can be portable/mobile devices (e.g., one or more cellphones).

20 Claims, 22 Drawing Sheets

(51) Int. Cl.
  *G07C 9/00* (2020.01)
  *H04L 9/08* (2006.01)
(52) U.S. Cl.
  CPC .. *H04L 9/0825* (2013.01); *G07C 2009/00793*
    (2013.01); *G07C 2209/08* (2013.01); *H04L*
    *2209/80* (2013.01); *H04L 2209/84* (2013.01)

(56) References Cited

U.S. PATENT DOCUMENTS

| | | | |
|---|---|---|---|
| 2009/0028006 A1* | 1/2009 | Ha | G06F 1/14 |
| | | | 368/46 |
| 2013/0099892 A1 | 4/2013 | Tucker et al. | |
| 2015/0262441 A1 | 9/2015 | Km et al. | |
| 2017/0116804 A1 | 4/2017 | Bae | |
| 2017/0352214 A1 | 12/2017 | Maiwand et al. | |
| 2020/0062216 A1 | 2/2020 | Fogelklou | |
| 2020/0099522 A1 | 3/2020 | Yang et al. | |
| 2021/0001806 A1* | 1/2021 | Kim | B60R 25/24 |
| 2021/0250355 A1 | 8/2021 | Galdo et al. | |
| 2021/0331646 A1 | 10/2021 | Schubert et al. | |
| 2022/0179447 A1* | 6/2022 | Matheswaran | H04W 12/065 |
| 2022/0231862 A1 | 7/2022 | Chen | |
| 2023/0360834 A1 | 11/2023 | Yamamoto | |
| 2024/0129288 A1* | 4/2024 | Zhou | H04L 67/125 |
| 2024/0198963 A1 | 6/2024 | Yamada et al. | |
| 2024/0317179 A1* | 9/2024 | Sun | H04W 12/08 |

OTHER PUBLICATIONS

Non-Final Office Action received for U.S. Appl. No. 18/152,361 dated Sep. 5, 2024, 28 pages.
Extended European Search Report received for European Patent Application No. 24150716.9 dated Jun. 14, 2024, 8 pages.
Communication pursuant to Rule 69 EPC received for European Patent Application No. 24150716.9 dated Jul. 22, 2024, 2 pages.
Final Office Action received for U.S. Appl. No. 18/152,361 dated Dec. 20, 2024, 34 pages.
Notice of Allowance received for U.S. Appl. No. 18/152,361 dated Mar. 18, 2025, 5 pages.

\* cited by examiner

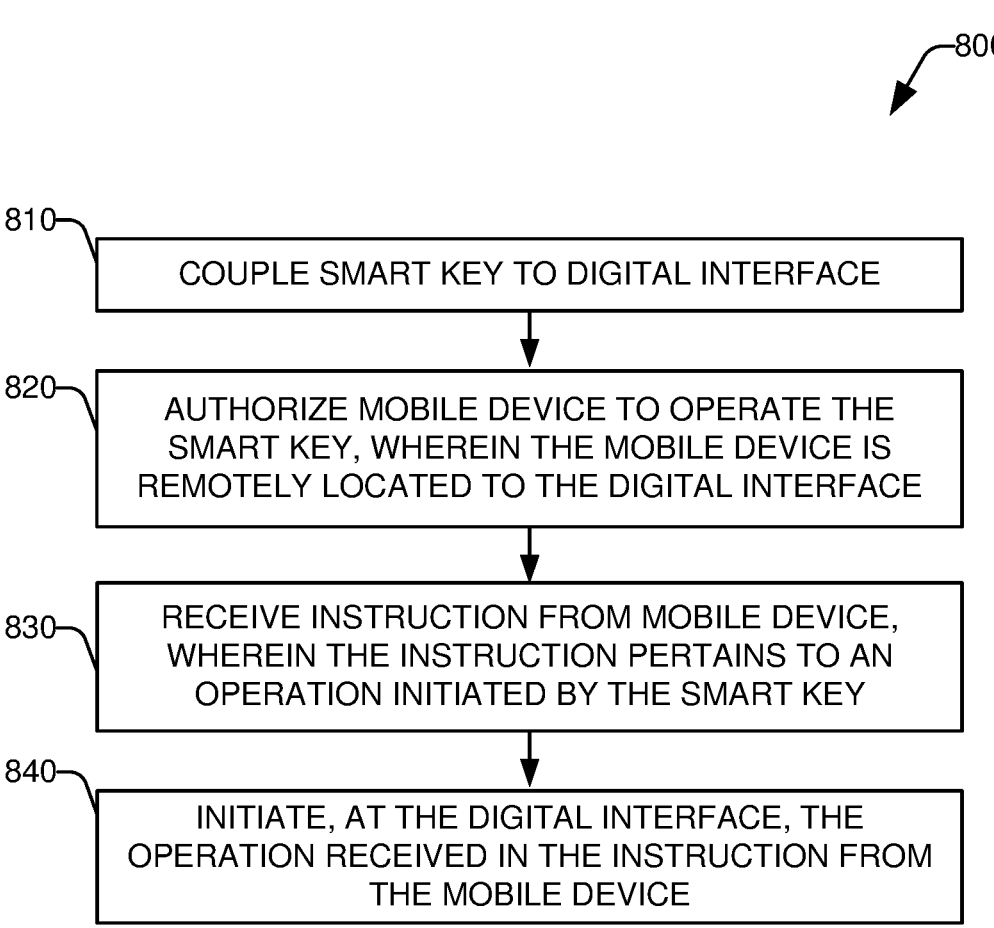

810 COUPLE SMART KEY TO DIGITAL INTERFACE

820 AUTHORIZE MOBILE DEVICE TO OPERATE THE SMART KEY, WHEREIN THE MOBILE DEVICE IS REMOTELY LOCATED TO THE DIGITAL INTERFACE

830 RECEIVE INSTRUCTION FROM MOBILE DEVICE, WHEREIN THE INSTRUCTION PERTAINS TO AN OPERATION INITIATED BY THE SMART KEY

840 INITIATE, AT THE DIGITAL INTERFACE, THE OPERATION RECEIVED IN THE INSTRUCTION FROM THE MOBILE DEVICE

FIG. 8

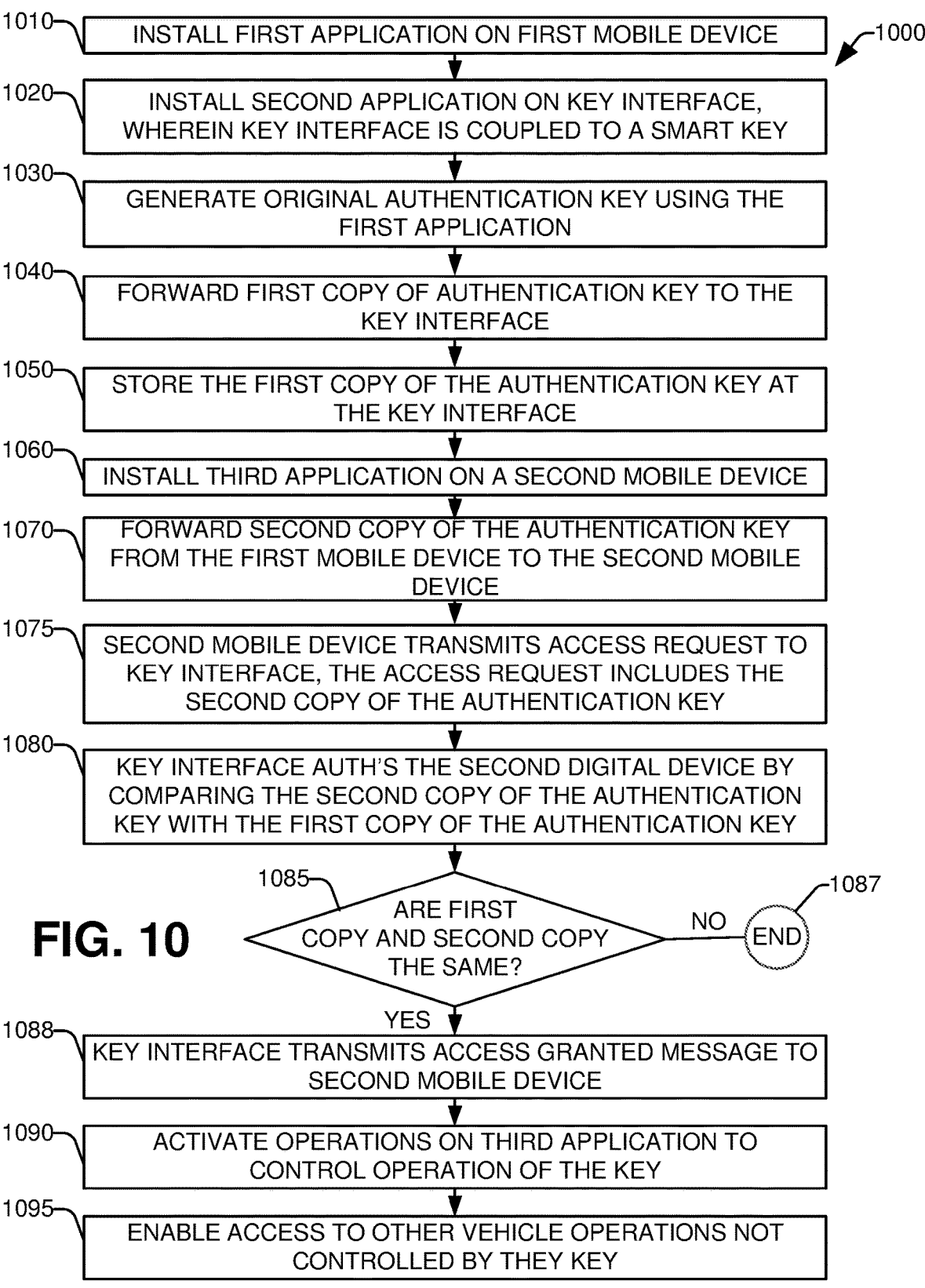

1010 — INSTALL FIRST APPLICATION ON FIRST MOBILE DEVICE ⟵1000

1020 — INSTALL SECOND APPLICATION ON KEY INTERFACE, WHEREIN KEY INTERFACE IS COUPLED TO A SMART KEY

1030 — GENERATE ORIGINAL AUTHENTICATION KEY USING THE FIRST APPLICATION

1040 — FORWARD FIRST COPY OF AUTHENTICATION KEY TO THE KEY INTERFACE

1050 — STORE THE FIRST COPY OF THE AUTHENTICATION KEY AT THE KEY INTERFACE

1060 — INSTALL THIRD APPLICATION ON A SECOND MOBILE DEVICE

1070 — FORWARD SECOND COPY OF THE AUTHENTICATION KEY FROM THE FIRST MOBILE DEVICE TO THE SECOND MOBILE DEVICE

1075 — SECOND MOBILE DEVICE TRANSMITS ACCESS REQUEST TO KEY INTERFACE, THE ACCESS REQUEST INCLUDES THE SECOND COPY OF THE AUTHENTICATION KEY

1080 — KEY INTERFACE AUTH'S THE SECOND DIGITAL DEVICE BY COMPARING THE SECOND COPY OF THE AUTHENTICATION KEY WITH THE FIRST COPY OF THE AUTHENTICATION KEY

1085 — ARE FIRST COPY AND SECOND COPY THE SAME? — NO — END 1087

FIG. 10

YES

1088 — KEY INTERFACE TRANSMITS ACCESS GRANTED MESSAGE TO SECOND MOBILE DEVICE

1090 — ACTIVATE OPERATIONS ON THIRD APPLICATION TO CONTROL OPERATION OF THE KEY

1095 — ENABLE ACCESS TO OTHER VEHICLE OPERATIONS NOT CONTROLLED BY THEY KEY

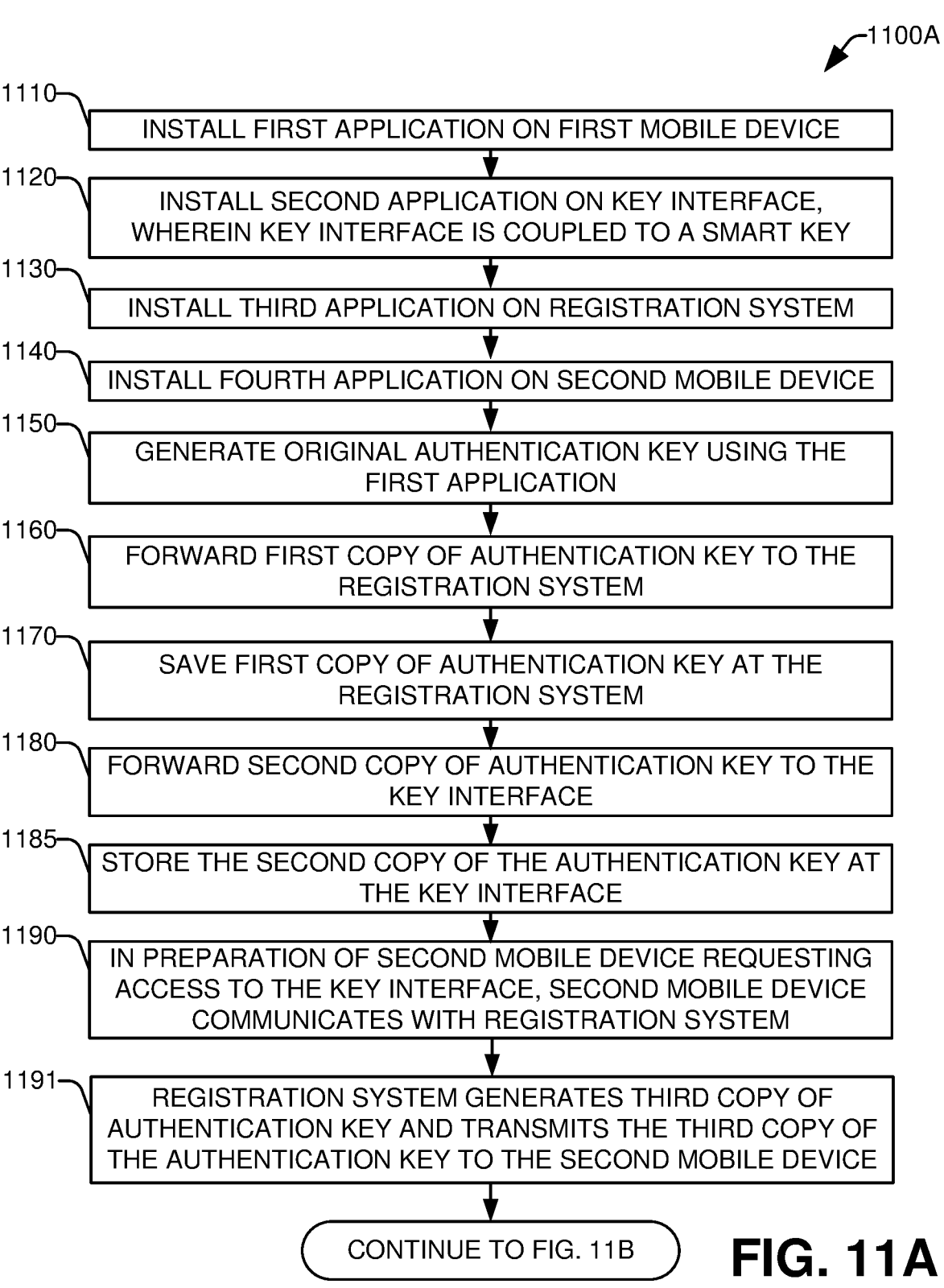

1100A

1110 — INSTALL FIRST APPLICATION ON FIRST MOBILE DEVICE

1120 — INSTALL SECOND APPLICATION ON KEY INTERFACE, WHEREIN KEY INTERFACE IS COUPLED TO A SMART KEY

1130 — INSTALL THIRD APPLICATION ON REGISTRATION SYSTEM

1140 — INSTALL FOURTH APPLICATION ON SECOND MOBILE DEVICE

1150 — GENERATE ORIGINAL AUTHENTICATION KEY USING THE FIRST APPLICATION

1160 — FORWARD FIRST COPY OF AUTHENTICATION KEY TO THE REGISTRATION SYSTEM

1170 — SAVE FIRST COPY OF AUTHENTICATION KEY AT THE REGISTRATION SYSTEM

1180 — FORWARD SECOND COPY OF AUTHENTICATION KEY TO THE KEY INTERFACE

1185 — STORE THE SECOND COPY OF THE AUTHENTICATION KEY AT THE KEY INTERFACE

1190 — IN PREPARATION OF SECOND MOBILE DEVICE REQUESTING ACCESS TO THE KEY INTERFACE, SECOND MOBILE DEVICE COMMUNICATES WITH REGISTRATION SYSTEM

1191 — REGISTRATION SYSTEM GENERATES THIRD COPY OF AUTHENTICATION KEY AND TRANSMITS THE THIRD COPY OF THE AUTHENTICATION KEY TO THE SECOND MOBILE DEVICE

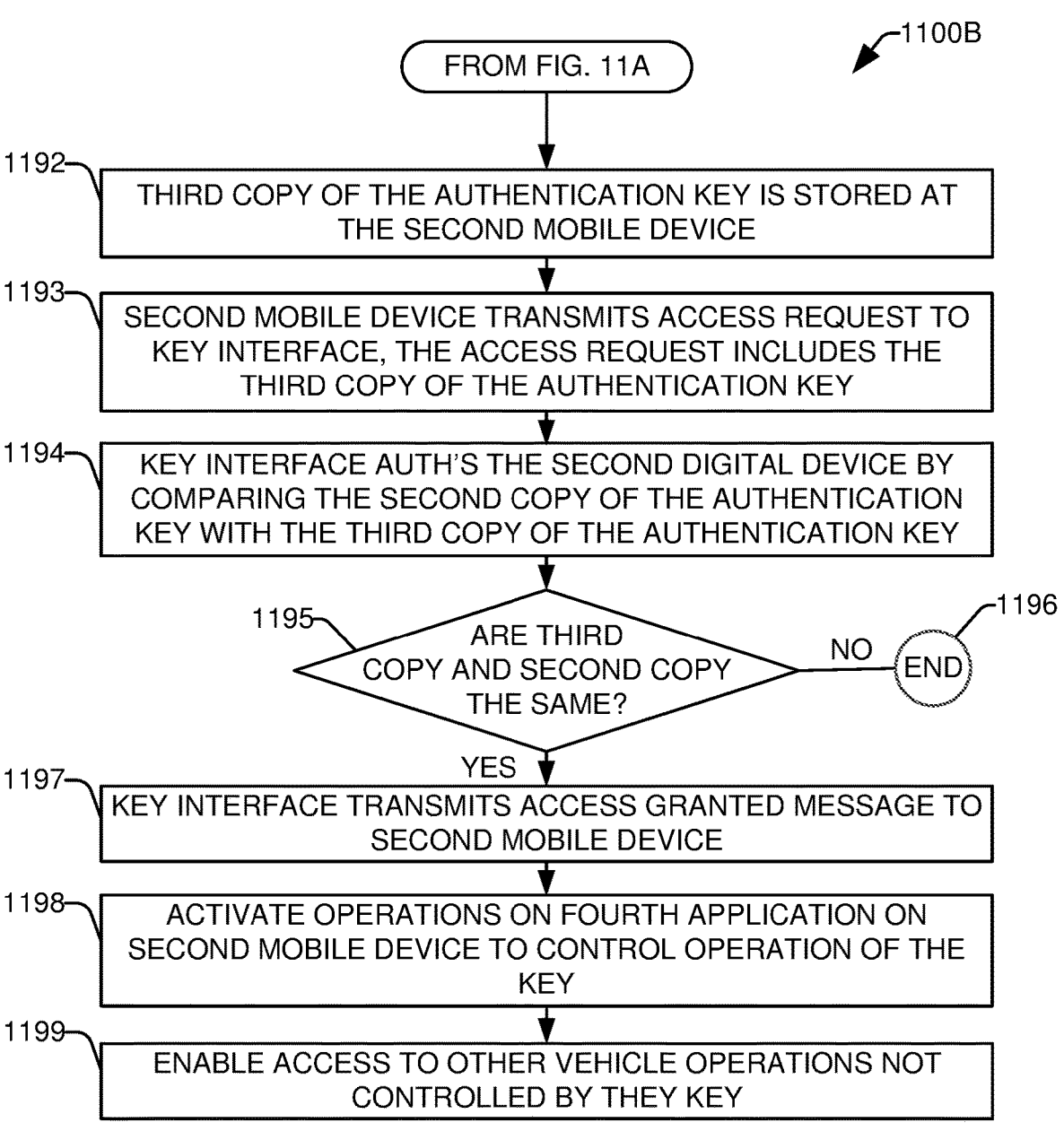

1100B

FROM FIG. 11A

1192 — THIRD COPY OF THE AUTHENTICATION KEY IS STORED AT THE SECOND MOBILE DEVICE

1193 — SECOND MOBILE DEVICE TRANSMITS ACCESS REQUEST TO KEY INTERFACE, THE ACCESS REQUEST INCLUDES THE THIRD COPY OF THE AUTHENTICATION KEY

1194 — KEY INTERFACE AUTH'S THE SECOND DIGITAL DEVICE BY COMPARING THE SECOND COPY OF THE AUTHENTICATION KEY WITH THE THIRD COPY OF THE AUTHENTICATION KEY

1195 — ARE THIRD COPY AND SECOND COPY THE SAME?          NO → END 1196

YES

1197 — KEY INTERFACE TRANSMITS ACCESS GRANTED MESSAGE TO SECOND MOBILE DEVICE

1198 — ACTIVATE OPERATIONS ON FOURTH APPLICATION ON SECOND MOBILE DEVICE TO CONTROL OPERATION OF THE KEY

1199 — ENABLE ACCESS TO OTHER VEHICLE OPERATIONS NOT CONTROLLED BY THEY KEY

FIG. 11B

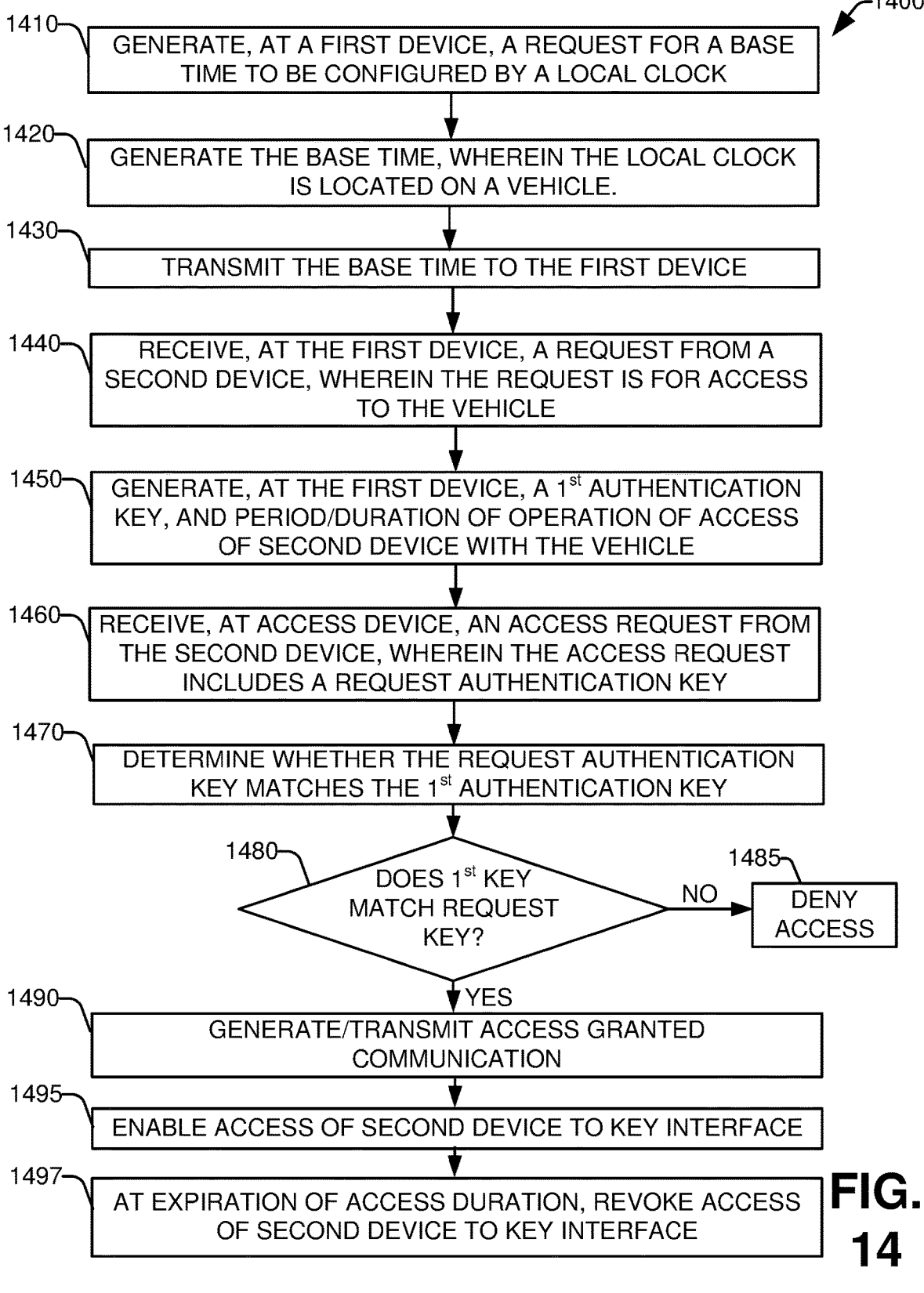

1400

1410 — GENERATE, AT A FIRST DEVICE, A REQUEST FOR A BASE TIME TO BE CONFIGURED BY A LOCAL CLOCK

1420 — GENERATE THE BASE TIME, WHEREIN THE LOCAL CLOCK IS LOCATED ON A VEHICLE.

1430 — TRANSMIT THE BASE TIME TO THE FIRST DEVICE

1440 — RECEIVE, AT THE FIRST DEVICE, A REQUEST FROM A SECOND DEVICE, WHEREIN THE REQUEST IS FOR ACCESS TO THE VEHICLE

1450 — GENERATE, AT THE FIRST DEVICE, A 1$^{st}$ AUTHENTICATION KEY, AND PERIOD/DURATION OF OPERATION OF ACCESS OF SECOND DEVICE WITH THE VEHICLE

1460 — RECEIVE, AT ACCESS DEVICE, AN ACCESS REQUEST FROM THE SECOND DEVICE, WHEREIN THE ACCESS REQUEST INCLUDES A REQUEST AUTHENTICATION KEY

1470 — DETERMINE WHETHER THE REQUEST AUTHENTICATION KEY MATCHES THE 1$^{st}$ AUTHENTICATION KEY

1480 — DOES 1$^{st}$ KEY MATCH REQUEST KEY?

NO → 1485 — DENY ACCESS

YES

1490 — GENERATE/TRANSMIT ACCESS GRANTED COMMUNICATION

1495 — ENABLE ACCESS OF SECOND DEVICE TO KEY INTERFACE

1497 — AT EXPIRATION OF ACCESS DURATION, REVOKE ACCESS OF SECOND DEVICE TO KEY INTERFACE

FIG. 14

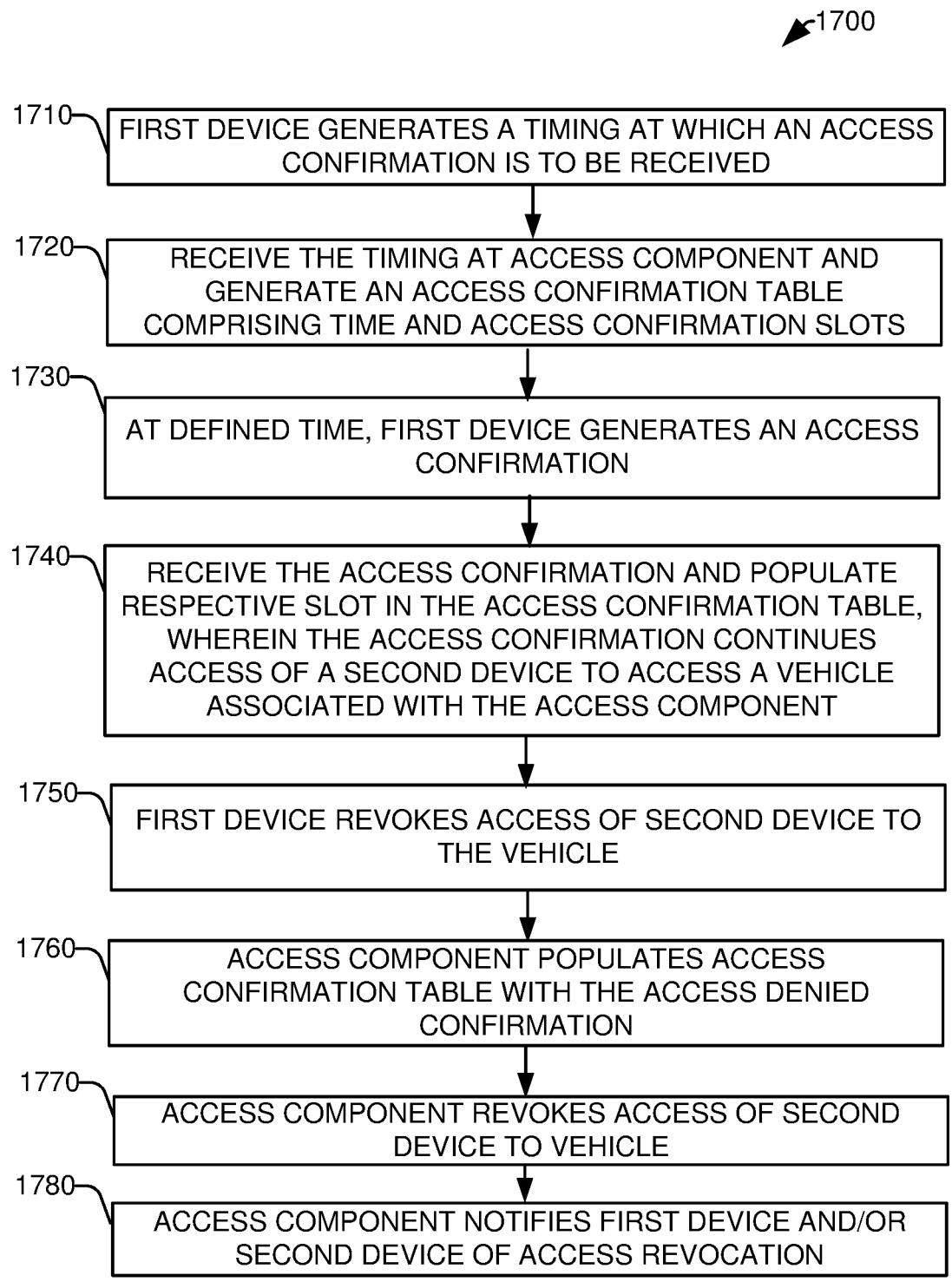

1700

1710 — FIRST DEVICE GENERATES A TIMING AT WHICH AN ACCESS CONFIRMATION IS TO BE RECEIVED

1720 — RECEIVE THE TIMING AT ACCESS COMPONENT AND GENERATE AN ACCESS CONFIRMATION TABLE COMPRISING TIME AND ACCESS CONFIRMATION SLOTS

1730 — AT DEFINED TIME, FIRST DEVICE GENERATES AN ACCESS CONFIRMATION

1740 — RECEIVE THE ACCESS CONFIRMATION AND POPULATE RESPECTIVE SLOT IN THE ACCESS CONFIRMATION TABLE, WHEREIN THE ACCESS CONFIRMATION CONTINUES ACCESS OF A SECOND DEVICE TO ACCESS A VEHICLE ASSOCIATED WITH THE ACCESS COMPONENT

1750 — FIRST DEVICE REVOKES ACCESS OF SECOND DEVICE TO THE VEHICLE

1760 — ACCESS COMPONENT POPULATES ACCESS CONFIRMATION TABLE WITH THE ACCESS DENIED CONFIRMATION

1770 — ACCESS COMPONENT REVOKES ACCESS OF SECOND DEVICE TO VEHICLE

1780 — ACCESS COMPONENT NOTIFIES FIRST DEVICE AND/OR SECOND DEVICE OF ACCESS REVOCATION

FIG. 17

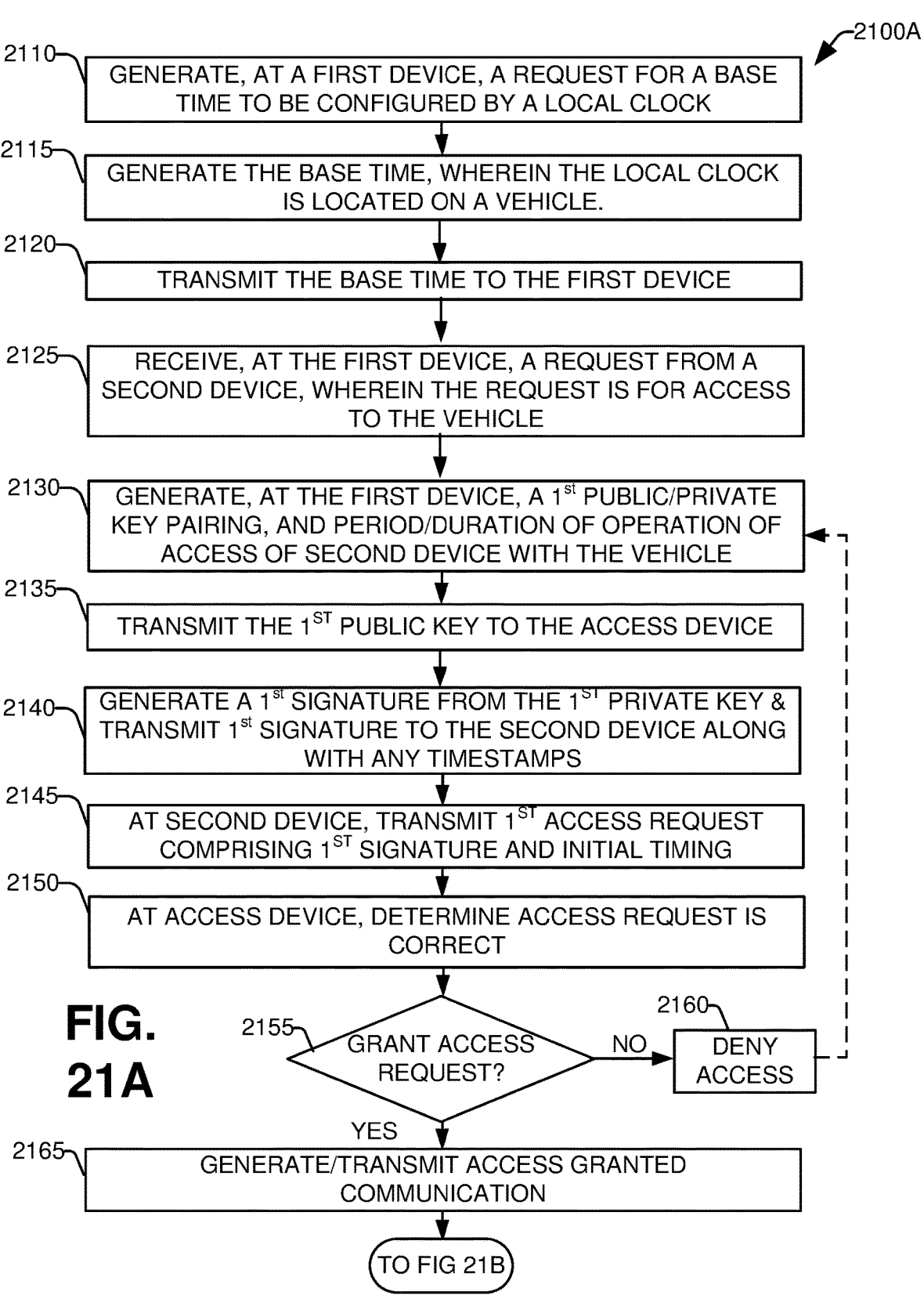

2100A

2110 — GENERATE, AT A FIRST DEVICE, A REQUEST FOR A BASE TIME TO BE CONFIGURED BY A LOCAL CLOCK

2115 — GENERATE THE BASE TIME, WHEREIN THE LOCAL CLOCK IS LOCATED ON A VEHICLE.

2120 — TRANSMIT THE BASE TIME TO THE FIRST DEVICE

2125 — RECEIVE, AT THE FIRST DEVICE, A REQUEST FROM A SECOND DEVICE, WHEREIN THE REQUEST IS FOR ACCESS TO THE VEHICLE

2130 — GENERATE, AT THE FIRST DEVICE, A 1st PUBLIC/PRIVATE KEY PAIRING, AND PERIOD/DURATION OF OPERATION OF ACCESS OF SECOND DEVICE WITH THE VEHICLE

2135 — TRANSMIT THE 1ST PUBLIC KEY TO THE ACCESS DEVICE

2140 — GENERATE A 1st SIGNATURE FROM THE 1ST PRIVATE KEY & TRANSMIT 1st SIGNATURE TO THE SECOND DEVICE ALONG WITH ANY TIMESTAMPS

2145 — AT SECOND DEVICE, TRANSMIT 1ST ACCESS REQUEST COMPRISING 1ST SIGNATURE AND INITIAL TIMING

2150 — AT ACCESS DEVICE, DETERMINE ACCESS REQUEST IS CORRECT

FIG. 21A

2155 — GRANT ACCESS REQUEST?  — NO — 2160 — DENY ACCESS

YES

2165 — GENERATE/TRANSMIT ACCESS GRANTED COMMUNICATION

TO FIG 21B

CONTROLLING ACCESS OF A VEHICLE BASED ON LOCAL CLOCK TIMINGS AND A DIGITAL KEY INTERFACE

TECHNICAL FIELD

This application relates to techniques facilitating access and operation of a vehicle without having access to a physical key configured to operate the vehicle.

BACKGROUND

A plethora of applications designed to assist with day-to-day activities are available on portable devices, such as cellphones. Such applications can enable a person to access a vehicle without having the physical key for that vehicle available. Further, vehicles can now be accessed without a key, e.g., via a touch sensor, code entry via a keypad, a fingerprint sensor, and the like.

However, there are still many vehicles in use that do not have such built-in, "smart" access technologies available. Many vehicles utilize what might be considered legacy technology, e.g., requiring a physical key to access the vehicle, such as a smart key. The key can include various buttons configured to respectively perform various functions such as lock/unlock a door(s), lock/unlock the trunk, start/stop engine, and the like. However, such legacy systems limit access and operation of a vehicle to only those who have a physical key in their possession.

The above-described background is merely intended to provide a contextual overview of some current issues and is not intended to be exhaustive. Other contextual information may become further apparent upon review of the following detailed description.

SUMMARY

The following presents a summary to provide a basic understanding of one or more embodiments described herein. This summary is not intended to identify key or critical elements, or delineate any scope of the different embodiments and/or any scope of the claims. The sole purpose of the Summary is to present some concepts in a simplified form as a prelude to the more detailed description presented herein.

In one or more embodiments described herein, systems, devices, computer-implemented methods, methods, apparatus and/or computer program products are presented that facilitate accessing and/or operating a vehicle without having to have access to a physical key configured for the vehicle.

According to one or more embodiments, a system is provided which can comprise a memory that stores computer executable components and a processor that executes the computer executable components stored in the memory. The computer executable components can comprise a key interface configured to control at least one operation of the vehicle. The components can further include an access component configured to control operation of the key interface, and further configured to receive a synchronization request from a first device, and in response thereto, access a real-time clock co-located onboard the vehicle. The access component can be further configured to, determine, in response to the synchronization request, a base time from a current state of the real-time clock, and further transmit the base time to the first device, wherein the base time is utilized to control access of a second device to the key interface.

In a further embodiment, the access component can be further configured to receive an access request from the second device, wherein the access request includes a timestamp, the timestamp is generated by the first device based on the base time generated by the access component prior to generation of the timestamp, and in response to a determination that the timestamp has a value that is the same or subsequent to the base time, provisionally grant access of the second device to the key interface.

In another embodiment, the access component can be further configured to, in response to a determination that the timestamp has a value that is not the same or subsequent to the base time, deny access of the second device to the key interface.

In a further embodiment, the access component can be further configured to receive, from the first device, a public cryptographic key, further receive, from the second device, a digital signature further included in the access request, determine whether the digital signature is paired with the public cryptographic key, and in response to a determination that the digital signature is paired with the public cryptographic key and the value of the timestamp is the same or subsequent to the base time, grant access of the second device to the key interface, and in response to a determination that the digital signature is not paired with the public cryptographic key, deny access of the second device to the key interface.

In an embodiment, the digital signature can be forwarded by the second device based on a private cryptographic key, wherein the private cryptographic key can be generated by the first device based on the public cryptographic key, and the signature is generated by the first device based on the private cryptographic key.

In an embodiment, the key interface can be configured to control operation of a physical key located on the vehicle, wherein the physical key is a smart key. In a further embodiment, the physical key can be configured to perform at least one of unlock a door on the vehicle, lock a door on the vehicle, start an engine located on board the vehicle, stop operation of an engine located on board the vehicle, unlock a tailgate to access a trunk on the vehicle, or lock a trunk tailgate on the vehicle.

In another embodiment, at least one of the first device or the second device is one of a smartphone, a mobile phone, a cellphone, a personal digital assistant (PDA), a handheld computing device, a smartwatch, a tablet computer, or a laptop computer.

In other embodiments, elements described in connection with the disclosed systems can be embodied in different forms such as computer-implemented methods, computer program products, or other forms. For example, in an embodiment, a computer-implemented method can be performed by a device operatively coupled to a processor. In an embodiment, the computer-implemented method can comprise receiving, by a local device comprising a processor, a first communication from a first device comprising a synchronization request from the first device, wherein the local device is located on a vehicle configured to control access to a key interface located on the vehicle, and the first device is located remote from the vehicle. In a further embodiment, the computer-implemented method can further include accessing, by the local device, a real-time clock co-located onboard the vehicle and determining, by the local device, in response to the synchronization request, a base time from a current state of the real-time clock. In a further embodiment, the computer-implemented method can further comprise transmitting, by the first device, the base time to the first device, wherein the base time is utilized to control access of the key interface by a second device.

In an embodiment, the computer-implemented method can further comprise receiving, by the local device, an access request from the second device, wherein the access request includes a timestamp, the timestamp is generated by the first device based on the base time, further determining, by the local device, that the timestamp has a value that is the same or subsequent to the base time, and furthermore, in response to a determination that the timestamp has a value that is the same or subsequent to the base time, provisionally granting, by the local device, access of the key interface by the second device, or in response to a determination that the timestamp has a value that is not the same or subsequent to the base time, denying, by the local device, access of the second device to the key interface.

In an embodiment, the computer-implemented method can further comprise receiving, by the local device, a public cryptographic key generated by the first device, further receiving, by the local device, a digital signature further included in the access request from the second device, further determining, by the local device, whether the digital signature is paired with the public cryptographic key, and in response to a determination that the digital signature is paired with the public cryptographic key and the value of the timestamp is the same or subsequent to the base time, granting, by the local device, access of the second device to the key interface and in response to a determination that the digital signature is not paired with the public cryptographic key, denying, by the local device, access of the second device to the key interface In an embodiment, the digital signature can be forwarded by the second device based on a private cryptographic key, wherein the private cryptographic key is generated by the first device based on the public cryptographic key, and the digital signature is generated by the first device based on the private cryptographic key.

In a further embodiment, communication between at least one of the local device and the first device can be via short range wireless communication technology, or communication between the local device and the second device can be via short range wireless communication technology.

Further embodiments can include a computer program product comprising a computer readable storage medium having program instructions embodied therewith. The program instructions are executable by a processor, and can cause the processor to perform operations, comprising (a) receiving a first communication from a first device, a synchronization request from a first device, wherein the local device is located on a vehicle configured to control access to a key interface located on the vehicle, and the first device is located remote from the vehicle, (b) further accessing a real-time clock co-located onboard the vehicle, (c) determining in response to the synchronization request, a base time from a current state of the real-time clock, and (d) transmitting the base time to the first device, wherein the base time is utilized to control access of the key interface by a second device.

In a further embodiment, the program instructions are further executable by the processor to cause the processor to perform operations further comprising: (a) receiving an access request from the second device, wherein the access request includes a timestamp, the timestamp is generated by the first device based on the base time, (b) further determining that the timestamp has a value that is the same or subsequent to the base time, and (c) in response to a determination that the timestamp has a value that is the same or subsequent to the base time, provisionally granting access of the key interface by the second device; or (d) in response to a determination that the timestamp has a value that is not the same or subsequent to the base time, denying access of the second device to the key interface.

In a further embodiment, the program instructions are further executable by the processor to cause the processor to perform operations further comprising: (a) receiving a public cryptographic key generated by the first device, (b) receiving a digital signature further included in the access request from the second device, wherein the digital signature is forwarded by the second device based on a private cryptographic key, wherein the private cryptographic key is generated by the first device based on the public cryptographic key, and the signature is generated by the first device based on the private cryptographic key, (c) determining whether the digital signature is paired with the public cryptographic key, and (d) in response to a determination that the digital signature is paired with the public cryptographic key and the value of the timestamp is the same or subsequent to the base time, granting access of the second device to the key interface, and (e) in response to a determination that the digital signature is not paired with the public cryptographic key, denying access of the second device to the key interface.

An advantage of the one or more systems, computer-implemented methods and/or computer program products can be enabling access and/or operation of a vehicle by a person not having the physical key in their possession. Access can be granted to a person, whereby, after being authorized to access the vehicle, the person can utilize an application on a portable device (e.g., a cellphone) to access and/or operate the vehicle. Per the various embodiments presented herein, operation of the vehicle is extended to those authorized to operate the vehicle, e.g., other family members, drivers operating fleet vehicles, rental car drivers, and the like. Further, the requirement to locate the key for operation is no longer required, a person simply needs a cellphone with the vehicle access application operating thereon. The various embodiments presented herein convert a vehicle having a legacy system comprising a physical key to be a "connected/smart" vehicle. In a further embodiment, access to the vehicle can be based on one or more timings generated by a local clock located on the vehicle, e.g., such that the one or more timings can always be utilized in the event of loss of timings from a GPS. In another embodiment, rather than access to a vehicle being granted for an entirety of time, by utilizing access confirmations and their receipt at a defined time, access to the vehicle can be revoked based on no generation/receipt of an access confirmation at a defined time. Further, communications can be conducted using short-range communication technology, such that in the event of loss of longer range telecommunication signals (e.g., 5G, internet, and suchlike), communications can be conducted via short-range communications (e.g., BLUETOOTH®, UWB, etc.). Accordingly, access to the vehicle by a second device can be configured by a first device using short range communications, duration of access can be based on timings generated by a local clock, and granting/revoking access can be based on receipt/no receipt of an access confirmation.

DESCRIPTION OF THE DRAWINGS

One or more embodiments are described below in the Detailed Description section with reference to the following drawings.

FIG. 8 is a flow diagram for a computer-implemented process for controlling access and operation of a smart key by a remotely located device, in accordance with one or more embodiments presented herein.

FIG. 10 is a flow diagram for a computer-implemented process regarding operations performed by devices during authentication and accessing of a key interface by a first device (owner device) and a second device (requesting device), in accordance with one or more embodiments presented herein.

FIGS. 11A and 11B present flow diagrams regarding an example scenario of operation of a smart key by a remote device, in accordance with one or more embodiments presented herein.

FIG. 14 illustrates a computer-implemented process for enabling access based on a local clock, in accordance with one or more embodiments presented herein.

FIG. 17 illustrates a computer-implemented process for enabling access based on receipt of a timed confirmation, in accordance with one or more embodiments presented herein.

FIGS. 21A and 21B illustrate a computer-implemented process for controlling access based on utilizing cryptographic keys and signatures, in accordance with one or more embodiments presented herein.

DETAILED DESCRIPTION

Figure 1:
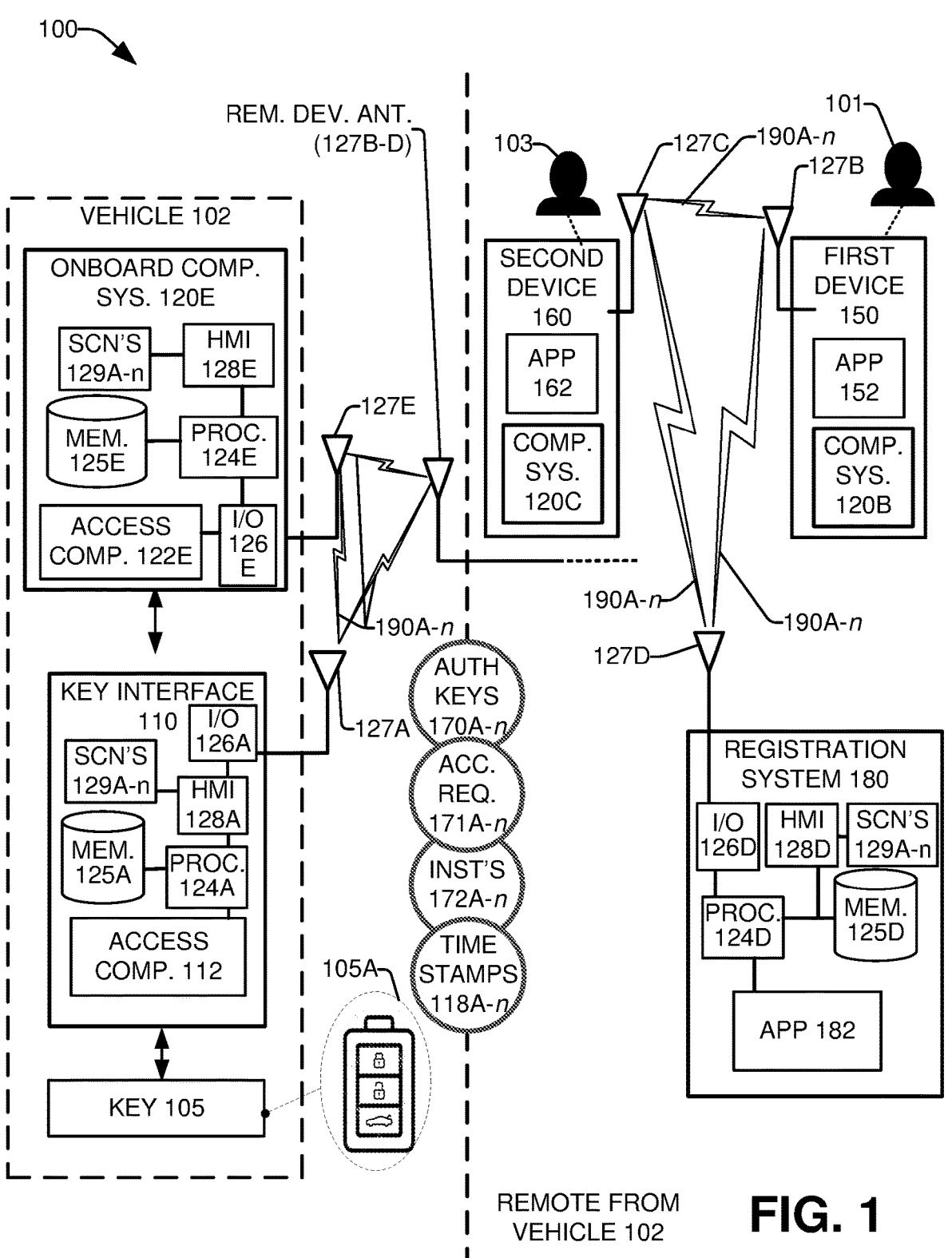
FIG. 1 is a block diagram representation of example components related to authorizing and enabling access of a vehicle without an operator having to have the physical key configured to access the vehicle available (e.g., in their possession), in accordance with one or more embodiments presented herein.

The following detailed description is merely illustrative and is not intended to limit embodiments and/or application or uses of embodiments. Furthermore, there is no intention to be bound by any expressed and/or implied information presented in any of the preceding Background section, Summary section, and/or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

It is to be understood that when an element is referred to as being "coupled" to another element, it can describe one or more different types of coupling including, but not limited to, chemical coupling, communicative coupling, electrical coupling, electromagnetic coupling, operative coupling, optical coupling, physical coupling, thermal coupling, and/or another type of coupling. Likewise, it is to be understood that when an element is referred to as being "connected" to another element, it can describe one or more different types of connecting including, but not limited to, electrical connecting, electromagnetic connecting, operative connecting, optical connecting, physical connecting, thermal connecting, and/or another type of connecting.

As used herein, "data" can comprise metadata. Further, ranges A-n are utilized herein to indicate a respective plurality of devices, components, signals etc., where n is any positive integer.

In the various embodiments presented herein, the disclosed subject matter can be directed to extending a vehicle with a legacy access system (e.g., requiring a physical key to gain access) to function and/or have functionality available akin to technology available on a "connected/smart" vehicle. As use and development of mobile/portable technology (e.g., cellphones) has become ubiquitous, vehicles are now available where many operational features of a vehicle can be controlled via a mobile device. However, the legacy systems utilizing a physical key (e.g., a smart key) do not have the benefit of operation using such mobile technology.

One or more embodiments presented herein can be directed to incorporating a physical key into a digital interface, wherein the digital interface enables the physical key and/or features of the physical key to be operated by mobile technology. The digital interface enables control of one or more vehicle operations (e.g., unlock, lock, operate) as well as interaction with the vehicle via data presented on a HMI (e.g., a screen on the vehicle dashboard), such as visualization(s) regarding vehicle status, location maps, etc. A first user of the vehicle (e.g., owner of the vehicle, first entity) can authorize a second user (e.g., a designated user, second entity) with access to/operation of the vehicle, wherein the second user does not have the vehicle key in their possession, with, for example, interaction with the vehicle being conducted via a software application operating on a device in the second user's possession, e.g., a cellphone or other mobile device.

In an embodiment, a second entity can be provided with all of the operations available on a smart key, with the operations/interactions being available via an HMI. In another embodiment, the first entity (e.g., owner of the vehicle) can limit options available to the second entity, e.g., access to the vehicle trunk is not available via the HMI/software application, one or more screens on the HMI are not available for interaction, and the like.

One or more of the embodiments presented herein enable a legacy vehicle to function as a smart vehicle enabling easier access of the vehicle by more than one entity, the vehicle can easily be borrowed without the physical key being handed over, and such activities as vehicle sharing, fleet management, vehicle rental, vehicle leasing, and the like are simplified compared to having to ensure the driver has the physical key in their possession.

In another embodiment, various communication technologies can be utilized to broaden scenarios of interaction between various devices, the vehicle (and onboard systems), and other systems (e.g., a registration system utilized as part of a vehicle lending, vehicle renting, and/or vehicle leasing operation).

In a further embodiment, various timings can be utilized to control/establish access of the vehicle/key interface whereby, rather than establishing the various timings based on a conventional approach, such as time determined/synchronized based on a global positioning system (GPS) or similar technology, the various timings can be established based on a real-time clock (RTC) or similar system/device located onboard the vehicle. Accordingly, in the event of GPS-based communications are lost, timing of operation of the vehicle can still occur based on operation of/communication with the local RTC. A first device (e.g., owner device) can communicate with an access component located on the vehicle, wherein the access component is communicatively coupled to the RTC and, in response to a request for time synchronization from the first device, the access component can generate and transmit a base time (calibration time, synchronization time) generated based on a current status/timing of the RTC, in accordance with the clocking frequency of the RTC. With the base time established, a future time can be determined/generated based on, for example, the number of clock pulses subsequently generated by the RTC (e.g., oscillation of a crystal located in the RTC) after the base time was generated. As further communications are further established between any of the first device and/or second device with the access component, the base time can be updated to facilitate re-synchronizing/re-calibrating the current time of utilized between the devices/components. Hence, with regard to system timings, the first device, the second device, and an onboard system (e.g., key interface/access component) utilizing the onboard clock can be configured to operate as a function of the onboard clock.

In a further embodiment, control of access to the vehicle by a second device can be controlled by a first device. For example, while an owner of the first device may have initially authorized the second device (and associated owner) to access the vehicle for a period of time, the first device can be utilized to revoke/terminate access by the second device based on defined, periodic time slots. For example, access to the vehicle by the second device is granted by the first device for 2 weeks, however, the first device is further required to transmit an access confirmation every 24 hours during the 2 week duration. As the access confirmations are received, slots in a database can be populated by the access component, and operation of the vehicle in conjunction with the second device proceeds. However, in the event of an access confirmation is not received (or a denied access notification is received) from the first device at the defined time, the associated slot in the database remains empty, upon which termination/revocation of access of the vehicle by the second device can be initiated.

In another embodiment, a scenario can arise where the first device and/or second device may no longer be communicatively coupled to the vehicle, however a third device can be in communication with both the vehicle and the first device and/or the second device such that the third device can function as an intermediate/intermediary device, acting as a go-between the vehicle and the first device and/or the second device. Hence, information can be exchanged between the vehicle and the first device and/or second device, wherein information can comprise a current operating condition(s) of the vehicle, vehicle location, vehicle destination, vehicle velocity, driving operation, current fuel/battery charge available, potential operating range of the vehicle before next refueling/recharging, and suchlike. The exchanged information can be in encrypted form and/or unencrypted form.

It is to be appreciated that while the various embodiments presented herein are directed towards incorporating technology into a vehicle, such as an automobile, the various embodiments are not so limited. Accordingly, the various technology can be applied to any systems that utilize a smart key, wherein the key can be incorporated into a digital interface enabling the system to be a smart system. Hence, the various embodiments herein can be applied to any situation comprising a lock interacting/interfacing with a key. Further, the various embodiments can be further utilized to enable access between devices and systems to exchange information while communications via the internet, 4G, 5G, and suchlike, and rather communications can be transmitted via short-range communication technologies such as UWB, BLUETOOTH®, and suchlike.

Turning now to the drawings, FIG. 1 illustrates a system 100 that can be utilized to authorize and enable access of a vehicle without an entity (e.g., future driver) having to have the physical key configured to access the vehicle available (e.g., in their possession), according to at least one embodiment.

System 100 comprises a vehicle 102 with various devices and components located thereon, such as a physical key 105, a key interface 110, an access component 112, and an onboard computer system 120E, as further described. In an embodiment, with access component 112 co-located on vehicle 102, access component 112 can be considered to be a local device operating in conjunction with the co-located/local key interface 110.

System 100 can further comprise various mobile devices, e.g., first device 150 (aka, owner device, first device operated by entity 101, first mobile device) and second device 160 (aka requesting device/second device operated by entity 103), which can have various components/software applications 152, 162, etc., and computer systems 120B and 120C respectively operating thereon. System 100 can, in a further embodiment, comprise a registration system 180 configured to control/authenticate access of the vehicle 102 and key interface 110.

In one or more embodiments, first device 150, second device 160, and/or the registration system 180, can be remotely located to the vehicle 102. The first device 150 and/or the second device 160 can be one of a smartphone, a mobile phone, a cellphone, a personal digital assistant (PDA), a handheld computing device, a smartwatch, a tablet computer, a laptop computer, or similar device.

First device 150 and/or second device 160 can be configured to exchange authentication keys 170A-n (e.g., digital signatures) using a peer-to-peer security protocol, wherein the authentication keys 170A-n can be configured to enable granting/permission for a user/entity 103 of second device 160 to access/operate the vehicle 102 owned by entity 101 of first device 150, as further described herein. In an embodiment, the authentication keys 170A-n can be shared between the first device 150 and the second device 160 via the registration system 180, as further described herein. In another embodiment, the authentication keys 170A-n can be shared between first device 150 and second device 160, and further with the access component 112 at the key interface 110, with or without assistance by registration system 180, as further described herein. The authentication keys 170A-n can be transmitted as part of one or more access requests 171A-n transmitted between first device 150, second device 160, and/or key interface 110. Further, once access has been granted to the key interface 110, further communications can be sent between the first device 150, second device 160, and/or the key interface 110, wherein the communications can include various instructions 172A-n (e.g., commands) to simulate operation of the key 105. As further described herein, access of vehicle 102 by second entity 103 can be revoked (e.g., by the first entity 101/first device 150) at any time, and further, one or more operational timings can be configured based on a local clock at vehicle 102.

Various timestamps 118A-n can be utilized as required for respective operations, e.g., unlimited access, start access, end access, and suchlike. Various timestamps 118A-n can be utilized, wherein the timestamps 118A-n can be generated based on a synchronization time/base time (e.g., base time 1320A-n generated by RTC 1310, as further described in FIG. 13). Timestamps 118A-n can be specific moments in time (e.g., a start time of access initiation) as well as a duration or period, and can include the following: ST timestamp=a start time at which access of the key interface 110 by second device 160 can be initiated; ET timestamp=an end time at which access of the key interface 110 by second device 160 is ceased/terminated; UT timestamp=an unlimited duration of access from a moment (e.g., ST) at which access of the key interface 110 by second device 160 is initiated (e.g., where vehicle 102 is to be operated by two or members of a family); OT timestamp=a time offset from an initial timing; RT=requested duration of time for which access of the key interface 110 by the second device 160 is initiated (e.g., RT=24 hrs, one week, one month, of unlimited duration UT, and suchlike), DT=defined duration of time, e.g., between ST and ET (e.g., 24 hours, 48 hours, a week, a month, a defined rental period, a defined lease period); RPT=a sub-duration of DT for which the second device 160 is required to request access to the access component 112 in response to an access notification generated every RPT by first device 150 (e.g., DT is 14 days, RPT can be configured by the first application 152 to be every 10 minutes, every hour, a 24 hour period, and suchlike); FDBT=first device base time which is equal to the base time 1320A-n generate by clock 1310; and suchlike. Utilization of timestamps 118A-n are described further with regard to FIGS. 9-21A.

In an embodiment, the key 105 can be coupled to key interface 110. Key 105 is a physical device also known as a smart key, an intelligent key, and suchlike (e.g., where key 105A in FIG. 1 provides representation of key 105 as a smart key). The key 105 can include various buttons, microchips, sensors, transceivers, radio-frequency identification devices (RFIDs), and the like, to enable interaction of the key 105 with the vehicle 102 (e.g., unlock a door of the vehicle 102). Further, the key 105 can have a smartcard format with an embedded RFID. The key interface 110 can be located anywhere on the vehicle 102, e.g., positioned under vehicle 102's dashboard, under a seat, in a glove compartment, etc., with the key 105 coupled (electronically and/or physically) to the key interface 110. In an embodiment, the key interface 110 and key 105 can be located inside the vehicle 102 in a location such that if a person smashes a window to gain access of vehicle 102 (e.g., to steal contents from the passenger compartment of vehicle 102), the key interface 110 and key 105 cannot be reached by the thief. The key interface 110 can further comprise an access component 112, which can be configured to receive one or more signals/commands/instructions regarding access to operations performed by the key 105 and other operations performed by an onboard computing system (OCS) 120E regarding operation of the vehicle 102. In an embodiment, the access component 112 can comprise of a component/software application configured to interface with the components/software applications 152 and 162 respectively operating on first device 150 and second device 160.

Turning momentarily to FIGS. 2-6, FIGS. 2-6 present respective views and configurations 200, 300, 400, 500, and 600, for co-locating the key 105 with the key interface 110, and, in an embodiment, electrically coupling the key 105 to the key interface 110, in accordance with one or more embodiments.

Figures 2, 3:
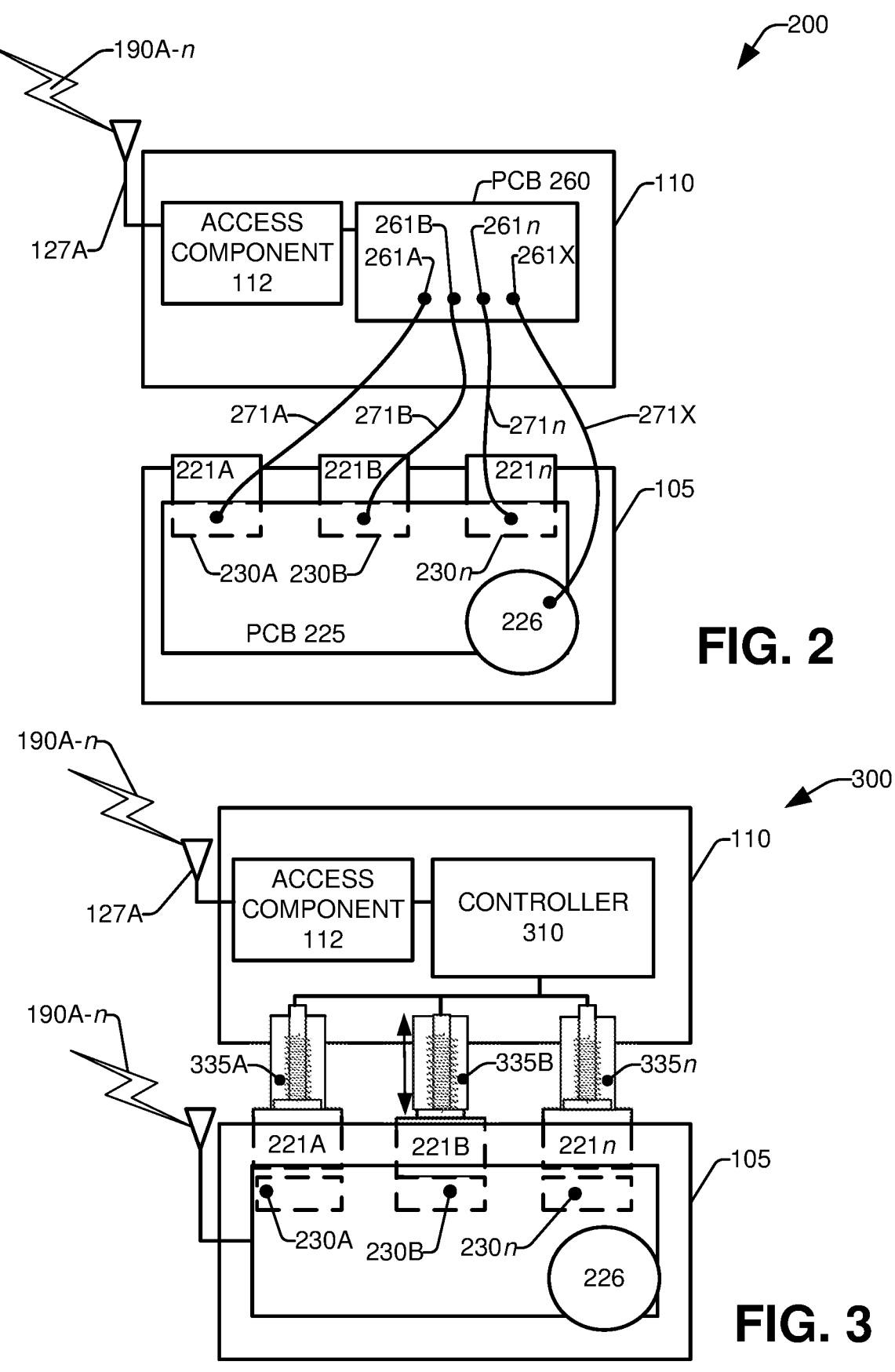
FIG. 2 is a block diagram representation comprising a key located at a key interface component, in accordance with one or more embodiments presented herein.
FIG. 3 is a block diagram representation comprising a key located at a key interface, in accordance with one or more embodiments presented herein.

FIG. 2 presents a system 200 comprising a key 105 located at a key interface 110 component, in accordance with an embodiment. Key 105 can be a physical key configured with various buttons 221A-n, to enable one or more operations of the vehicle 102. For example, button 221A, when activated, can be configured to lock/unlock a door(s) of the vehicle 102; button 221B, when activated, can be configured to lock/unlock the vehicle 102 trunk/boot; button 221n, when activated, can be configured to start/stop the vehicle engine; as well as being configured for any other operation (s) that is enabled by one of more buttons provided on a physical key as available in the marketplace such as open/close a trunk/boot of a vehicle, start/stop an engine configured to propel the vehicle, activating/deactivating a key battery, or any other operation provided on a smart key.

In an embodiment, per FIG. 2, coupling of the key 105 with key interface 110 can entail removing a cover of the key 105 to expose the underlying printed circuit board (PCB) 225 with electrical circuits 230A-n for operating the buttons 221A-n available for electrical connection. The various electrical connections for the button circuits 230A-n on the PCB 225 of the key 105 can be hardwired to respective connections 261A-n on a PCB 260 in the key interface 110. As shown, connections 261A-n on PCB 260 can be respectively connected (e.g., soldered) to button circuits 230A-n of the respective buttons 221A-n on PCB 225. For example, button 221A and circuit 230A can be connected to connection 261A via wire 271A, wherein, for example, button 221A is configured to lock/unlock a door of vehicle 102; button 221B and connector 230B can be connected to connection 261B via wire 271B, wherein, for example, button 221B is configured to lock/unlock the trunk of vehicle 102; button 221n and connector 230n can be connected to connection 261n via wire 271n, wherein button 221n is configured to stop/start the engine of vehicle 102. Further, component 226 of PCB 225 can be a battery and circuit to power the key 105 when it is being used as a standalone smart key, however, the circuit 226 can be connected to PCB 260 and connector 261X with a wire 271X such that the PCB 260 is providing power to PCB 225. In an embodiment, any of the respective button circuits 230A-n or connections/circuits 261A-n can include a relay or relay-type circuit configured to open/close in response to an instruction (e.g., instructions 172A-n) generated by a mobile device (e.g., either of first device 150 or second device 160).

Turning to FIG. 3, a system 300 is presented comprising the key 105 located at the key interface 110, in accordance with an embodiment. The key interface 110 can be designed to locate/hold the key 105, such that the key 105 can be readily removed if required, e.g., without having to break the physical connections of a key that is physically connected by hard wiring (per the embodiment presented in FIG. 2). For example, the key 105 can be clamped into placed at the key interface 110, alternatively, it can be located by a snap-fit or other locating means. The key interface 110 can be configured with physical motors/actuators 335A-n positioned to physically operate the one or more buttons 221A-n on the key 105, such that when a command (e.g., an instruction 172A-n) is received to operate a button 221A-n on the key 105, the respective physical actuator(s) 335A-n is activated (e.g., by controller 310 operating in conjunction with access component 112) and the respective button 221A-n is physically moved, with a corresponding control operation performed (e.g., unlocking of the door). As shown in FIG. 3, physical actuator 335B has been activated, causing button 221B to be pressed which closes the circuit of button circuit 230B; physical actuators 335A and 335n are currently not activated, with buttons 221A and 221n not being selected/pressed.

Figure 4:
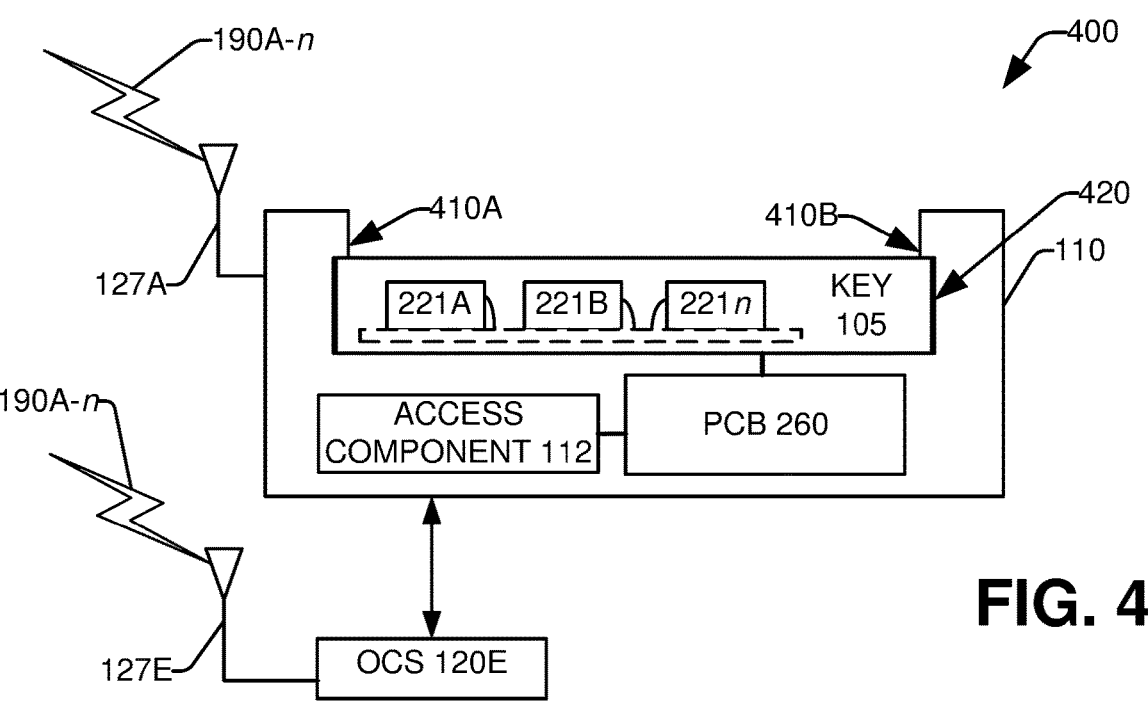
FIG. 4 is a block diagram representation comprising a key co-located with a key interface, in accordance with one or more embodiments presented herein.

As shown in FIG. 4, and as previously described, in an embodiment, the key 105 can be co-located with the key interface 110. In an embodiment, the key 105 can be placed at the key interface 110 and removed as needed. The key 105 can be placed in a recess 420 formed in the key interface 110 and held in place by a snap-fit configuration such as clips/protruding portions 410A-B.

Figure 5:
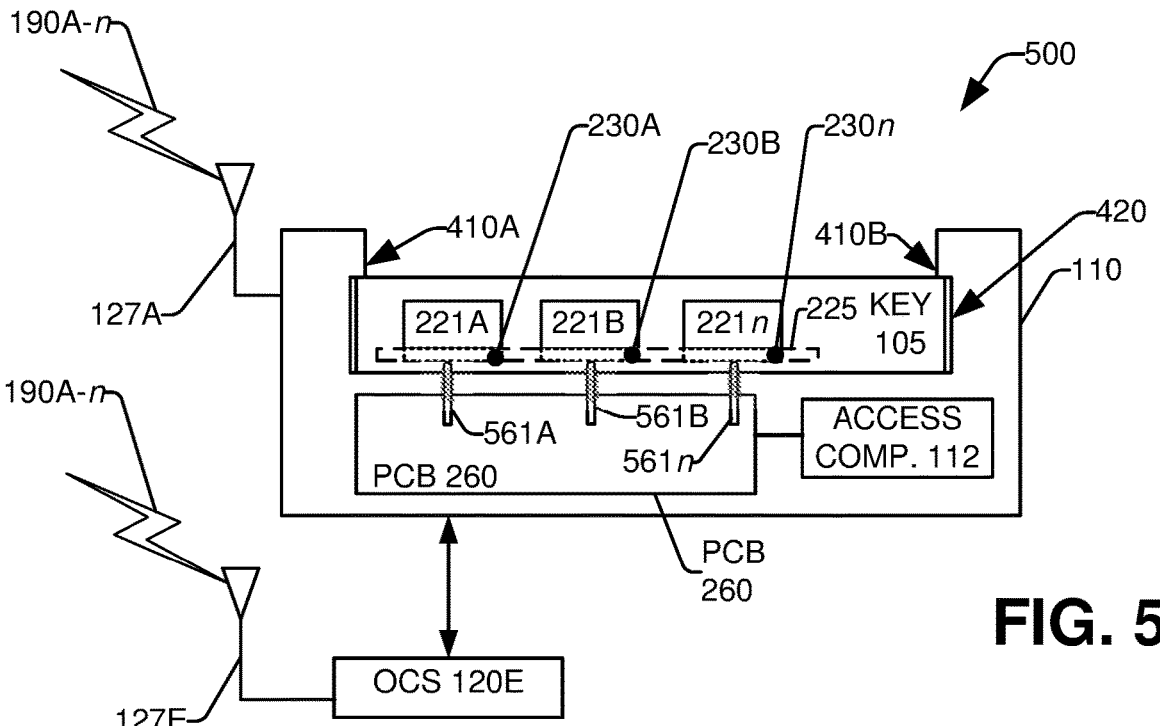
FIG. 5 is a block diagram representation of pin connectors connecting a PCB on a key with a PCB on a key interface, in accordance with one or more embodiments presented herein.

Turning to FIG. 5, system 500, in another embodiment, PCB 260 can have a series of pin connectors 561A-n exposed such that when the PCB 225 is placed adjacent to the PCB 260, a respective pin 561A-n on PCB 260 contacts a respective button circuit 230A-n of the buttons 221A-n on PCB 225, thereby electrically connecting key 105 (and PCB 225) to the key interface 110 (and PCB 260). The pin connectors 561A-n can be spring loaded, or similar mechanical structure, to facilitate pressing (engaging) of the respective pin connector 561A-n against a respective button circuit 230A-n. In an embodiment, while not shown, the key 105 can be fabricated such that an outer cover of the key 105 has a removable portion. When the removable portion is removed, the PCB 225 of key 105 is exposed, enabling the respective pin connectors 561A-n to contact the respective circuits 230A-n of PCB 225 for the respective buttons 221A-n. When the key 105 is removed from the key interface 110, the removable portion of the cover can be put back in place, covering the PCB 225.

Figures 6, 7:
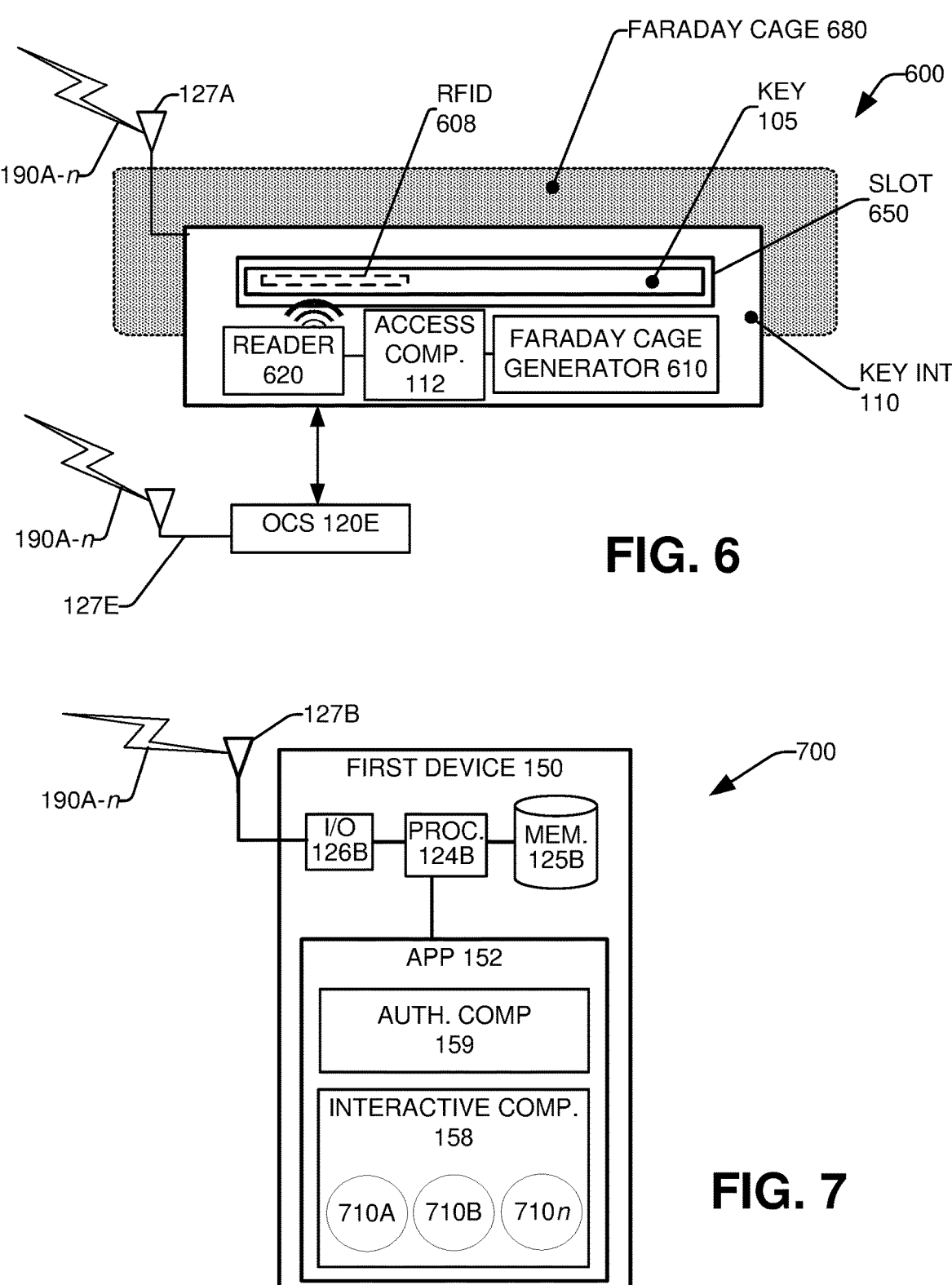
FIG. 6 is a block diagram representation of a smart card key located in a key interface, in accordance with one or more embodiments presented herein.
FIG. 7 is a block diagram representation illustrating a mobile device with various components and functionality, in accordance with one or more embodiments presented herein.

FIG. 6, system 600, presents another embodiment, wherein the key 105 is a smartcard with an embedded RFID 608. In an embodiment, the key interface 110 can have a slot 650 incorporated into it, into which the key 105 can be inserted. In another embodiment, the key 105 can be securely placed on an exterior surface of the key interface 110. The RFID 608 can be read by reader 620, e.g., using near-field technology or other technology enabling interaction with the RFID 608. Until authorization to access operation of the key 105 has been established, a Faraday Cage generator 610 is active and creates a Faraday Cage 680 around the key 105 and RFID 608. The access component 112 can be configured to control operation of the Faraday Cage Generator 610. While the Faraday Cage 680 is active, operational commands (e.g., instructions 172A-n) from either of first device 150 and/or second device 160 can be ignored/prevented from reaching key 105. However, once authorization of access to the key interface 110 has been established, e.g., via access component 112, the access component 112 can instruct the Faraday Cage generator 610 to cease operation, causing the Faraday Cage 680 to be removed, and communications (e.g., via signals 190A-n) between either of the first device 150, second device 160, and/or the key interface 110 to occur.

The key interface 110 can be coupled to the OCS 120E, wherein the OCS 120E can be configured to monitor and control various operations performed during access and operation of the vehicle 102. Such operations can include monitoring and controlling operation of vehicle 102's propulsion system (e.g., engine), operation of headlights while driving under different conditions, etc. As further shown in FIG. 1, the OCS 120E can be communicatively coupled to a presentation component, HMI 128E (e.g., a display, a graphical-user interface (GUI), and the like) and screens 129A-n. HMI 128E can be incorporated into an instrument cluster, dashboard, etc., of vehicle 102. HMI 128E can be configured to receive and present various operational information, location information, GPS data, data, alerts, instructions, and the like, to an operator (e.g., a driver) of the vehicle 102 regarding operation and/or operating conditions of the vehicle 102, wherein the information, data, etc., can be presented via one or more screens (not shown). In an embodiment, as well as an entity being able access the vehicle 102 as a function of authentication of the key 105 and key interface 110, the authentication process also enables the entity to view/access/interact with content displayed on an interactive display of the HMI 128E.

Per the various embodiments presented herein, entity 101 of the vehicle 102 can have the key interface 110 installed on the vehicle 102 with the key 105 attached thereto. Referring to FIG. 1 in conjunction with FIG. 7, FIG. 7 presents a system 700 in accordance with an embodiment, illustrating the first device 150, e.g., entity 101's cellphone. In an embodiment, the owner can interact with the key interface 110 via a component/software application 152 operating on the first device 150. First device 150 can be any of a smartphone, a mobile phone, a cellphone, a personal digital assistant (PDA), a handheld computing device, a smartwatch, a tablet computer, a laptop computer, or any other suitable device to facilitate one or more embodiments herein. The key interface 110 can have a copy of the software application operating thereon, e.g., operating as part of the access component 112. The software application 152 and the access component 112 can be configured such that as authentication keys 170A-n are generated and synchronized (e.g., between an authentication component 159 operating on the first device 150 and access component 112), the owner, entity 101, of vehicle 102 can use the first device 150 to interact with the key interface 110, and one or more operations performed by the key 105. As shown in FIG. 7, various buttons 710A-n can be presented on a screen of the first device 150, wherein the buttons 710A-n can be configured to function in a manner comparable to physically pressing any of buttons 221A-n on the key 105. For example, upon selection of button 710A, a signal 190A can be transmitted from the first device 150 to the key interface 110, wherein the signal 190A includes an instruction 172A (e.g., in various instructions 172A-n) indicating that button 710A has been selected on the first device 150 and button 221A should be activated on the key 105/key interface 110 (e.g., button 221A is configured to open door of vehicle 102). Accordingly, the interaction between the first device 150 and application 162 with the key interface 110 and access component 112 enables accessing and operation of vehicle 102 to be similar to that of a smart vehicle.

Extending the foregoing concepts, in an embodiment, the system 100 can further comprise a second device 160, having software application 162 operating thereon, wherein software application 162 can provide functionality similar to software application 152, as previously described. The first device 150 can be referred to as a first mobile device, and the second device 160 can be referred to as a second mobile device. Software application 162 can be configured to interact with any of first device 150, key interface 110, and/or registration system 180. For example, in a scenario where second device 160 is interacting with key interface 110, buttons can be presented on a screen of the second device 160 for selection and control of buttons 221A-n on the key 105. The buttons presented on the second device 160 can be comparable in look and function to buttons 710A-n presented on first device 150, as shown in FIG. 7.

In another embodiment, the system 100 can further comprise a registration system 180, having software application 182 operating thereon, wherein the registration system 180 is configured to operate with first device 150, key interface 110, and/or second device 160. Registration system 180 can be utilized to facilitate sharing of authentication keys 170A-n between the first device 150 and second device 160, e.g., where the owner operates a rental fleet of vehicles, for example. In a further embodiment, the system 100 can further be configured with communications (e.g., any of 190A-n) established between any of the first device 150, key interface 110, second device 160, registration system 180, and/or OCS 120E interacting therebetween.

Figure 9:
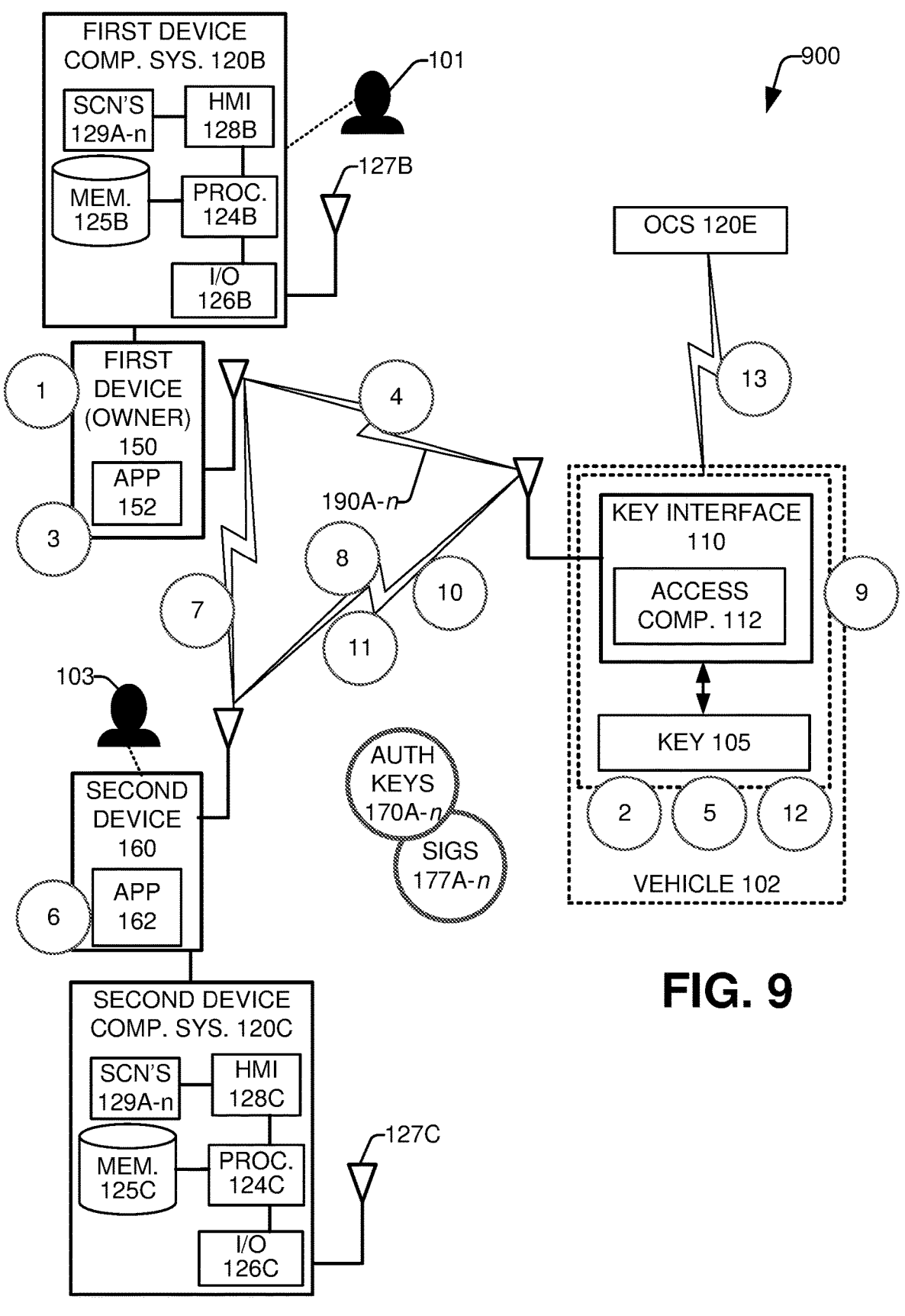
FIG. 9 is a block diagram representation of devices and operations performed during authentication and accessing of a key interface by a first device (owner device) and a second device (requesting device), in accordance with one or more embodiments presented herein.

As shown in FIGS. 1, 7, and 9, the various systems and devices can include computer systems 120A-n comprising at least one processor (e.g., processor 124A-n) and at least one memory (e.g., memory 125A-n), respectively located on the key interface 110, the OCS 120E, first device 150, second device 160, and/or the registration system 180. Functions performed and functionality provided by the at least one processor 124A-n can include execution of various computer-executable components, functions, operations, etc., at the respective system and or device, as presented herein. The respective memory 125A-n can be utilized to store the various computer-executable components, functions, code, etc., for execution and operation by a processor 124A-n associated with the respective memory 125A-n. The respective memory 125A-n can further store information and data (e.g., authentication keys 170A-n, access requests 171A-n, instructions 172A-n, requests/notifications/communications, etc., such as communications 1305A-n, communications 1315A-n, communications 1325A-n, times 1320A-n, communication/confirmations 1605A-n, communication 1625A-n, revoke access confirmation 1606A-n, T, P, ST, ET, CT, confirmation table 1610, time slots 1621A-n, access confirmation slots 1631A-n, public keys 2020A-n, private keys 2025A-n, signatures 2031A-n, and suchlike, to enable execution (e.g., by the respective processor 124A-n) of the device authentication process, access request process, operation of key 105 and/or key interface 110, calibrate respective operations based on timing from a local clock (as further described), enable and revoke access to a key interface 110 (as further described), and the like.

As further shown, the various systems and devices can respectively include an input/output (I/O) component (e.g., I/O component 126A-n), wherein an I/O component can be configured to operate as a transceiver configured enable transmitting/receiving/processing of various signals (e.g., any of signals 190A-n) comprising authentication codes, digital signatures, synchronization codes, instructions, commands, information, data, and the like (e.g., authentication keys 170A-n, access requests 171A-n, instructions 172A-n) between any of the key 105, the key interface 110, the OCS 120E, the first device 150, the second device 160, and/or the registration system 180, as located onboard, or remote to, the vehicle 102. Also, as further shown, the various devices can further include an antenna 127A-n, which can be utilized to transmit communication signals (e.g., any of signals 190A-n) between the respective devices and components located on and/or remotely located to the vehicle 102. Depending upon the configuration being utilized, as further described herein, any of antennas 127A-n of the remotely located devices/systems 150, 160, 180, can be interacting with the onboard devices/systems 105, 110, 120.

Any suitable technology can be utilized to enable the various embodiments presented herein, e.g., authorizing a first device 150 or a second device 160 to have access to the key interface 110, transmission of commands between first device 150, second device 160, registration system 180, key interface 110, and suchlike. Suitable technologies include short-wave radio communications, BLUETOOTH®, cellular technology (e.g., 3G, 4G, 5G), internet technology, ethernet technology, ultra-wideband (UWB), DECA-WAVE®, IEEE 802.15.4a standard-based technology, Wi-Fi technology, Radio Frequency Identification (RFID), Near Field Communication (NFC) radio technology, and the like.

FIG. 8 illustrates a flow diagram for a computer-implemented process 800 for controlling access and operation of a smart key by a remotely located device, in accordance with at least one embodiment.

At 810, a smart key (e.g., key 105) is coupled to a digital interface (e.g., key interface 110). As described herein, coupling of the smart key to the digital interface can comprise of any of hardwired electrical connections (e.g., button connection circuits 230A-n hardwired to PCB connections 261A-n), buttons operated by actuators (e.g., buttons 221A-n and actuators 335A-n), pin connections (e.g., pins 561A-n and button connections 230A-n), and such like. The digital interface can be configured to receive instructions from one or more external devices and systems (e.g., first device 150, second device 160, registration system 180, and suchlike), and simulate operation of one or more buttons (e.g., buttons 221A-n) of the smart key.

At 820, the digital interface can be configured to control access of the one or more external devices to operate the smart key buttons. Access can be controlled by any suitable technology utilized for authenticating (e.g., via authentication keys 170A-n, authentication certificates, digital signatures, and the like) received from the one or more devices/systems (e.g., first device 150, second device 160, registration system 180, and suchlike). For example, access authentication can be based upon comparison of shared authentication keys/certificates/signatures to confirm that a first authentication key matches an original authentication key generated to grant access to digital interface and the smart key.

At 830, in the event of a mobile device is authorized and granted access to generate one or more smart key operations, instructions can be received at the digital interface from the mobile device in accord with the smart key button operations, e.g., lock/unlock door, etc.

At 840, the digital interface can initiate the operation at the smart key in accord with the one or more instructions received from the mobile device (e.g., at 830). For example, an instruction can be to unlock the door, upon which the door on the vehicle (e.g., vehicle 102) can be unlocked by the digital interface (e.g., as a result of a relay operating at either the button circuit 221A-n or the PCB circuit connection 261A-n).

Various communications can occur between various devices and systems, based upon the approach selected from the various techniques for authenticating the respective devices, authentication key sharing, key commands, etc. To aid understanding FIG. 9 and FIG. 10 can be read concurrently, such that an act or step in process 1000 can be identified in the system drawing 900, accordingly, operations presented in FIG. 9 are referenced as (1)-(13) with corresponding acts/steps presented in FIG. 10 as 1010-1095. FIG. 9, system 900, presents an example scenario comprising various operations and activities performed during authentication and accessing of the key interface 110 by first device 150 and a second device 160, in accordance with an embodiment. FIG. 10 is a flow diagram 1000 presenting example operations conveyed in FIG. 9, in accord with one or more embodiments.

At (1)/1010, the software application 152 is installed on the first device 150. Software application 152 can be configured to interact directly with the key interface 110, and further, authenticate a second mobile device, e.g., second device 160 to access the interface 110.

At (2)/1020 a software application, access component 112 is further installed on the key interface 110, wherein the access component 112 can be configured to authenticate a request for access to the key interface 110 and further, control access and/or operation of the key interface 110, e.g., how key interface 110 interacts with the key 105, as well as how the key interface 110 interacts with other devices and components such as OCS 120E, the first device 150, the second device 160, and suchlike.

At (3)/1030, application 152 on first device 150 can generate an original authentication key 170A (also referred to as original authentication key, digital signature, a first cryptographic key, a first copy of public key, and suchlike), wherein the original authentication key 170A is stored locally (e.g., in memory 125B).

At (4)/1040 the application 152 can be configured to forward (e.g., in signal 190A) a copy 170B (e.g., a second copy of public key) of the authentication key 170A to the access component 112/key interface 110. Generation of authentication keys 170A and 170B and transmission of authentication key 170B can be in response to interaction with first device 150 by an entity 101 (e.g., an owner of vehicle 102), e.g., via an HMI 128B and screens 129A-n (not shown) interacting with application 152.

At (5)/1050, on receipt of the copy 170B of authentication key 170A, the access component 112 can be configured to store the copy 170B of the authentication key locally (e.g., in memory 125A) for subsequent authentication of an access request.

At (6)/1060, a further copy of the software application 162 can be installed on the second device 160.

At (7)/1070, an information/data exchange can occur between first device 150 and second device 160 whereby a copy of the authentication key (herein labelled as authentication key 170C, e.g., a private cryptographic key) is forwarded from the first device 150 to the second device 160. Communications and information sharing between the first device 150 and the second device 160 can be in a "peer to peer" operation. In an embodiment, the forwarding of the copy 170C of the authentication key can be via any suitable technology, e.g., by placing first device 150 and second device 160 in close proximity such that the copy 170C of the authentication key can be transferred using short range communication technology such as BLUETOOTH® or similar technology. In another embodiment, forwarding of the copy 170C of the authentication key can be via the internet technology, cellphone technology, etc. Selection of a respective communication technology to implement for communications 190A-n between any of the first device 150, the second device 160, vehicle 102/key interface 110, and/or registration system 180, can be implemented as a function of the environment in which the respective devices and/or systems are operating, such as a garage where 5G signals are occluded but short range communication techniques are available. Any of the devices and systems can be configured to select a suitable communication technology to utilize. E.g., any of applications 152, 162, and/or 182, or access component 112 can be configured to determine the communication technology to implement to communicate with another of the devices/systems. Extending the garage scenario further, application 152 on the first device is to transmit copy 170C of the authentication key to the second device 160. Application 152 can be configured to step through a sequence of communication technologies available to first device 150. In the event of not being able to establishing communications via 5G, internet, or similar technologies, application 152 can be configured to try to implement a short range communication technology (e.g., in response to a pairing operation invoked at device 150 by entity 101) to establish communications with, for example, second device 160. In response to the communication pairing between the first device 150 and the second device 160 being successful, communication of authentication keys 170A-n, access requests 171A-n, instructions 172A-n, and suchlike, can be conducted via the short range communication technology. In an embodiment, the respective communications between first device 150, second device 160, key interface 110/access component 112, and/or registration system 180, can be continually adjusted in accordance with the communication technology available at a particular location of operation.

At (8)/1075, the second device 160 can generate and transmit an access request 171A to the key interface 110. In an embodiment, during interaction between the second device 160 and the key interface 110, the second device 160 can be located at a distance from the vehicle 102 such that communications between the second device 160 and the key interface 110 can be conducted using short range communication technology such as BLUETOOTH® and the like. The access request 171A can include a signature 177A-n, wherein the signature 177C is generated from the copy of the authentication key 170C. Generation and transmission of the authentication key 170C/signature 177C can be in response to interaction with second device 160 by an entity 103 (e.g., an entity requesting use of vehicle 102), e.g., via an HMI 128C and screens 129A-n (not shown) interacting with application 162.

At (9)/1080 the access component 112 can compare the copy of authentication key 170B received from the first device 150 with the copy of the authentication key 170C/signature 177C received from the second device 160. In an embodiment, all three copies of the authentication keys 170A-C can be generated by the first device 150, e.g., first device 150 is configured to retain a first copy 170A of the authentication key, forward a second copy 170B of the authentication key to the key interface 110/access component 112, and further forward a third copy 170C of the authentication key to the second device 160. In another embodiment, authentication keys 170A and 170B can be public cryptographic keys, while authentication key 170C can be a private cryptographic key from which application 152 can generate a signature 177C (e.g., a cryptographic signature) to be forwarded to application 162. Authentication keys 170A/170B can be paired with authentication key 170C, with signature 177C generated from authentication key 170C, whereby, given that signature 177C is generated from the private authentication key 170C, and private authentication key 170C is the private component of the public authentication keys 170A/170B, access component 112 can be configured to compare the signature 177C with the public authentication key 170B stored at access component 112, and in the event of signature 177C is found to match with authentication key 170B, the private authentication key 170C at the first device 150 can be considered to be the private cryptographic key of the public authentication key 170B, and accordingly, second device 160 is operating under the authority of the first device 150. In the event of the access component 112 determines that the signature 177C does not match with authentication key 170B, the access component 112 can be configured to determine that the signature 177C is generated from a private authentication key 170D, wherein private authentication key 170D is not the private counterpart of the public authentication keys 170A/170B, e.g., private authentication key 170D was not the private authentication key 170C generated by the first application 152, and hence, access component 112 can deny the access request received from the second device 160. (Such concepts are further described in FIGS. 20-21B).

At (10)/1085, in response to determining that NO the authentication keys (e.g., keys 170A/170B and key 170C/signature 177C) do not match, the access component 112 can be configured to transmit a message to the second device 160 that access is denied, or alternatively, no interaction occurs between the key interface 110 and the second device 160. Process 1000 can end at 1087.

Returning to (10)/1085, in response to determining that YES the authentication keys (e.g., keys 170A/170B and key 170C/signature 177C) do match, the operations can advance to (11)/1088, whereby the access component 112 can transmit a message to the second device 160 that access is granted and further, that vehicle operation options on application 162 can be activated for access to vehicle 102.

At (12)/1090, in response to the access granted message, the various operation options on the application 162 can be activated for interaction between the second device 160 and the key interface 110 for operation of vehicle 102.

At (13)/1095, the access component 112 can further extend access and operation of the vehicle 102, such that the access component 112 can be configured to inform the OCS 120E that operation of vehicle 102 is granted to the second device 160. Accordingly, the HMI 128E can be activated by the OCS 120E, along with any other features available to the user of the second device 160 as needed to operate vehicle 102.

FIGS. 11A and 11B, flow diagram 1100, presents another example scenario of operation of a smart key by a remote device, in accord with one or more embodiments.

At 1110, a first version of a software application (e.g., software application 152) is installed on a first mobile device (e.g., first device 150).

At 1120, a second version of the software application (e.g., access component 112) is installed on a key interface (e.g., key interface 110), wherein the key interface is configured to replicate operation of a smart key coupled to the key interface. The smart key is configured to perform one or more operations at a vehicle, e.g., open vehicle door, and the like.

At 1130, a third version of the software application (e.g., software application 182) is installed on a registration system (e.g., registration system 180), wherein the registration is configured to communicate with any of the first mobile device, the key interface, the smart key, and a second mobile device (e.g., second device 160).

At 1140, a fourth version of the software application (e.g., software application 162) is installed on the second mobile device. In an embodiment, the registration system can be a central system operating at, for example, a car fleet office, a car rental/hire office, and the like. Furthering the example, the owner of the second mobile device wants to rent a vehicle, however, the car is operated with a smart key. Rather than, as with conventional operations, giving the owner of the second mobile device the smart key, the second mobile device can have the fourth version of the software application stored thereon, in conjunction with an authentication key, enabling the second mobile device to communicate with the key interface in a "smart" manner.

At 1150, an original version of an authentication key (e.g., authentication key 170A) is generated at the first mobile device.

At 1160, a first copy of the authentication key (e.g., authentication key 170B) is transmitted from the first mobile device to the registration system.

At 1170, the first copy of the authentication key is saved at the registration system.

At 1180, a second copy of the authentication key (e.g., authentication key 170C) is transmitted to the key interface.

At 1185, the second copy of the authentication key is saved at the key interface.

At 1190, the second mobile device can request access (e.g., in an access request 171A) to the key interface, wherein the request is made to the registration system.

At 1191, in response to the request to access the key interface by the second mobile device, a third copy of the authentication key (e.g., authentication key 170D) can be generated at the registration system and transmitted from the registration system to the second mobile device.

At 1192, the third copy of the authentication key is stored at the second mobile device (e.g., in memory 125C).

At 1193, an access request (e.g., access request 171B) is transmitted from the second mobile device to the key interface, wherein the access request can include the third copy of the authentication key.

At 1194, the software application on the key interface can compare the second copy of the authentication key previously stored at the key interface with the third copy of the authentication key received from the first mobile device.

At 1195, in response to determining that NO, the second and third copies of the authentication keys do not match, the access application can transmit a message (access request message 171B) to the second mobile device indicating that access is denied, or alternatively, no interaction occurs between the key interface and the second mobile device. Process 1100 can end at 1196.

Returning to 1195, in response to determining that YES the second and third copies of the authentication keys do match, the operations can advance to 1197, whereby the access application can transmit a message (access request message 171C) to the second mobile device that access is granted and further, that vehicle operation options on the second software application can be activated for access to the vehicle.

At 1198, in response to the access granted message, the various operation options on the fourth application operating on the second mobile device can be activated for interaction between the second mobile device and the key interface/smart key for operation of the vehicle.

At 1199, the second software application operating at the key interface can further extend access and operation of the vehicle, such that the second software application can be configured to inform an OCS (e.g., OCS 120E) at the vehicle, that operation of the vehicle is granted to the second mobile device. Accordingly, a HMI (e.g., HMI 128E) operating in conjunction with the OCS, is made available to an operator of the second mobile device along with any features as needed/configured to operate vehicle.

Figure 12:
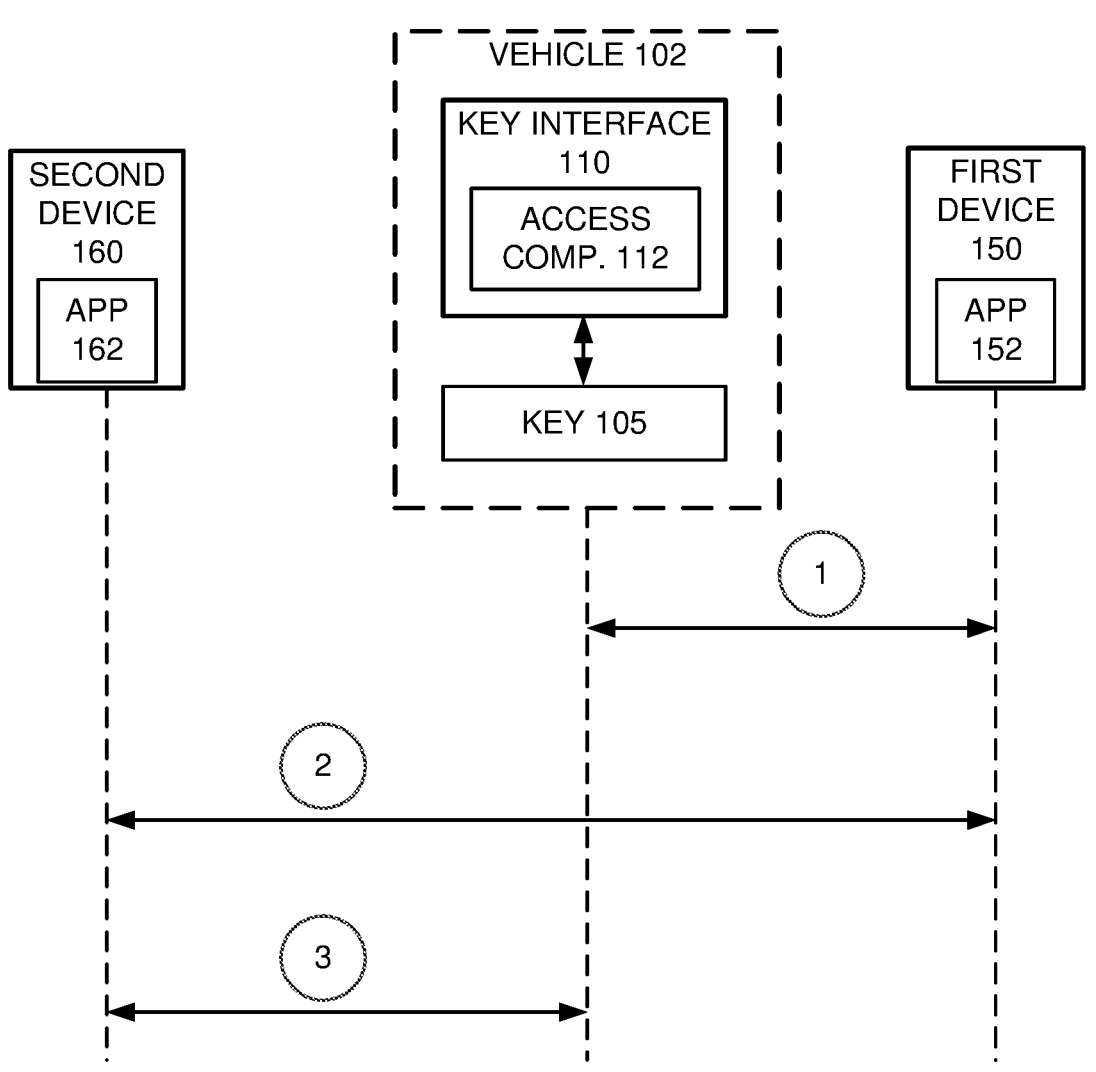
FIG. 12 presents a schematic illustrating a peer-to-peer security protocol that enables one entity to cryptographically verify "ownership" of a vehicle from another entity based on public keys and signatures from trusted third parties, in accordance with one or more embodiments presented herein.

FIG. 12 presents an embodiment utilizing a peer-to-peer security protocol that enables one party (e.g., the key interface 110) to cryptographically verify any type of data (e.g., ownership of the vehicle 102) from another party (e.g., second device 160) based on public keys and signatures from trusted third parties (e.g., first device 150).

As shown in FIG. 12, three parties are involved: first device 150, the key interface 110 (and access component 112), and the second device 160. In an embodiment, the second device 160 wants to establish ownership of the vehicle 102, and thereby operate functions available for key 105. The key interface 110 is configured to accept encrypted data from parties such as the second device 160 and verify ownership of the vehicle 102 by the second device 160. To enable the second device 160 asserting ownership, the key interface 110 relies on cryptographic signatures from a trust third party, the first device 150. The first device 150 can create cryptographic signatures that can be used to certify ownership of the vehicle 102, e.g., by the second device 160. With the first device 150 being trusted by both the key interface 110 and the second device 160, the key interface 110 can authorize access by the second device 160.

In the embodiment presented in FIG. 12, the following terms are utilized: A party is any of the first device 150, the key interface 110, the second device 160; an Identity key is used to cryptographically identify a party; Signatures are used to cryptographically verify ownership and integrity of a party's identity key and "ownership" of the vehicle 102; and Certificates contain pairs of identity keys and signatures from the parties that have verified the ownership and integrity of a party's identity key and "ownership" of the vehicle 102. A list of identity keys from trusted parties can be used verify that one or more certain third parties have verified the ownership and integrity of a party's identity key and "ownership" of the vehicle 102. The integrity and ownership can be verified for any type of data, wherein here, data is "ownership" of the vehicle 102.

As shown in FIG. 12, the peer-to-peer security protocol comprises three stages: (1) Establish Trust, (2) Certify Ownership, and (3) Verify ownership.

STAGE 1—Establish Trust: The key interface 110 (e.g., access component 112) and the first device 150 (e.g., application 152) mutually authenticate each other, wherein the key interface 110 adds the first device 150 as a trusted party (e.g., in memory 125A). Effectively, the ownership is establishing ownership of the vehicle 102.

STAGE 2—Certify Ownership: The second device 160 (e.g., application 162) and the first device 150 (e.g., application 152) mutually authenticate each other. The first device 150 creates a signature that certifies the second device's 160 ownership of the vehicle 102. The second device 160 adds the signature and first device 150's public key to a certificate.

STAGE 3—Verify Ownership: the second device 160 authenticates with the key interface 110 using the certificate with the first device 150's public key and signature. The key interface 110 can verify the second device's 160 ownership of the vehicle 102 without further contact with the first device 150.

In an embodiment, STAGES 1-3 can be conducted using any communication process between the respective parties, e.g., using BLUETOOTH® or other suitable technology. Accordingly, per FIG. 12, the STAGE 1-3 can be performed via near-field technology, such as BLUETOOTH®, hence, no internet access is necessary by any of the devices. Per the foregoing, once STAGE 3 has been conducted and the second device 160 has verified ownership of the vehicle 102, the application 162 operating on the second device 160 can be granted access (e.g., by access component 112) to operate the key 105.

Figure 13:
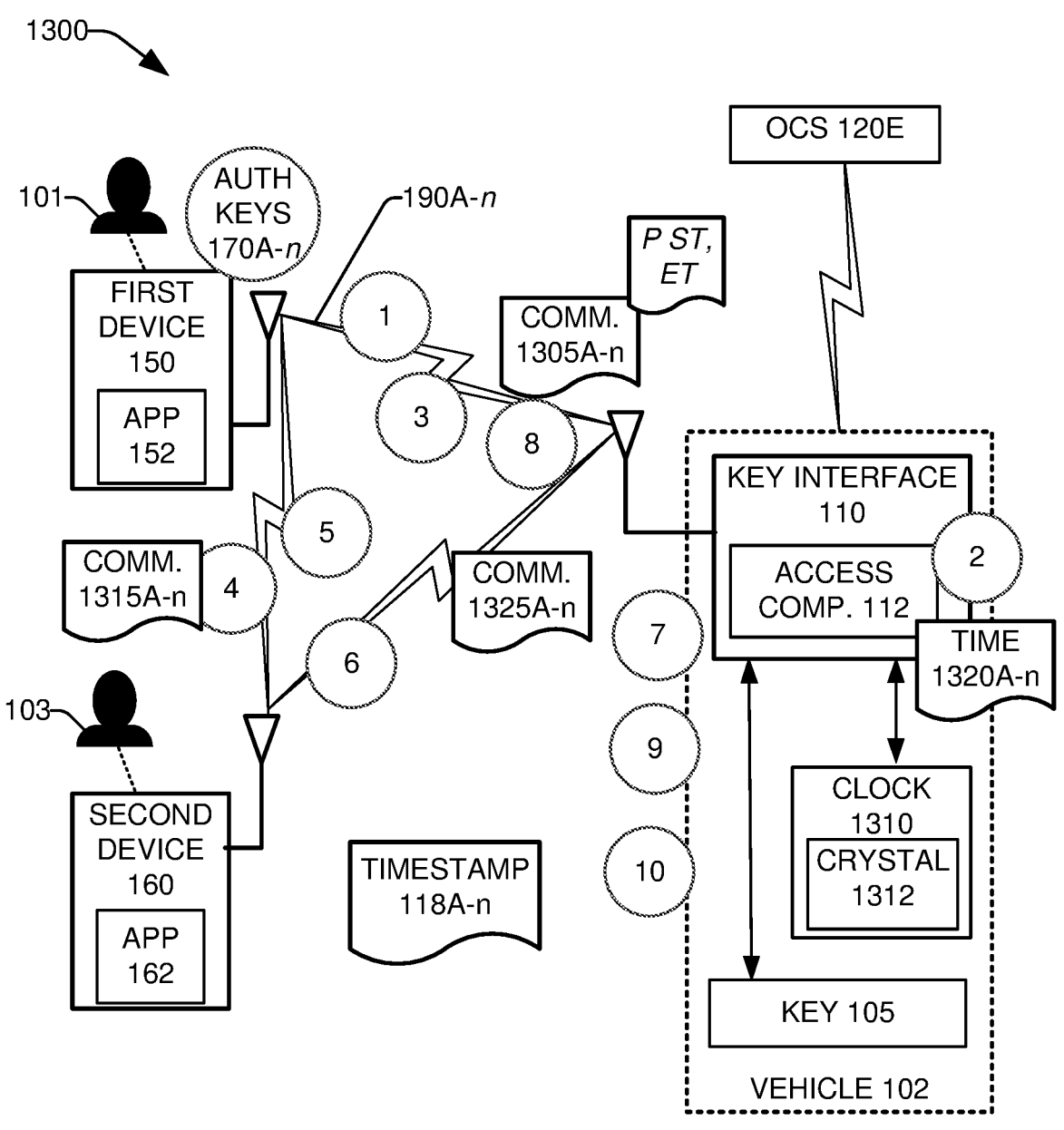
FIG. 13 presents a schematic illustrating use of a clock onboard a vehicle to control operational access to the vehicle, in accordance with one or more embodiments presented herein.

FIG. 13, schematic 1300, illustrates use of a clock onboard a vehicle to control operational access to the vehicle, in accordance with an embodiment. FIG. 14, process 1400 illustrates a computer-implemented process for enabling access based on a local clock, in accordance with one or more embodiments. To aid understanding FIG. 13 and FIG. 14 can be read concurrently, such that an act or step in process 1400 can be identified in the system drawing 1300, accordingly, operations presented in FIG. 13 are referenced as (1)-(13) with corresponding acts/steps presented in FIG. 14 as 1010-1095.

As previously mentioned, an example scenario of operation can involve an environment in which communication technologies such as 5G communications, interactions via a data server (e.g., registration system 180, a local server, a remote server) are not available, and suchlike. Such an environment can be a parking garage facility where the building structure occludes communications by the respective devices and components to enable access to the internet, a data server, and suchlike. In an embodiment, advantage can be taken of those communication technologies enabling short-distance interaction between devices that are proximate to each other, such as short-wave radio communications, BLUETOOTH®, UWB, and suchlike.

At (1)/1410, the software application 152 on first device 150 can generate and transmit a communication 1305A (e.g., in a series of communications, notifications, requests, and suchlike) to the key interface 110 located on vehicle 102. Communication 1305A-n can be generated in response to interaction with the first device 150 by an entity 101 interacting with the first device 150 via an HMI 128B (operation of which can be as previously described with regard to HMIs 128A-n presented in FIG. 1).

In an embodiment, as further described, entity 101 can have an intent to allow entity 103 access to/operation of vehicle 102 for a defined period of time DT. Upon the defined period of time DT expiring, access to/operation of vehicle 102 by entity 103 is to be revoked/cancelled. In another embodiment, entity 101 can have the intent to allow entity 103 to have unlimited access to/operation of vehicle 102 for an unlimited period of time UT. In such an embodiment utilizing UT, once an initial access by the second device 160 is authorized, no further authorization (e.g., periodic authorization) is required, whereby access can continually indefinitely or until terminated/revoked via first device 150.

Communication 1305A can comprise a request for the key interface 110/access component 112 to provide a time 1320A-n generated by a clock 1310 operating locally at vehicle 102.

At (2)/1420, access component 112 can be configured to receive the time request in communication 1305A, and in response thereto, access component 112 can be further configured to generate a time 1320A-n, wherein time 1320A (aka base time, synchronization time, calibration time) is the current time of the local clock 1310. Clock 1310 can include a local clocking system/crystal configured to generate a pulse/clocking pulse at a known frequency from which time-driven/frequency-driven operations can be performed, particularly while clock 1310/access component 112 are not in communication system that can provide a time, such as a global positioning system (GPS), not shown. Clock 1310 can be a real-time clock (RTC) comprising an integrated circuit, or suchlike, including a crystal oscillator (e.g., quartz), battery, etc. In an embodiment, clock 1310 can generate and store a count of pulses generated by the crystal from which a time 1320A-n can be determined, whereby access component 112 can be configured to transmit the pulse count, as a series of pulse counts are generated, a time can be generated from each duration between respective pulse counts (e.g., based on the known clocking frequency of the crystal oscillator (not shown). In another embodiment, the clock 1310 can be configured to generate base time 1320A-n (e.g., a current time, time stamp) in a human-readable format, e.g., HR: MIN: SECS.

At (3)/1430, the access component 112 can be further configured to transmit the base time 1320A to the first device 150, wherein access component 112 can be configured to transmit the base time 1320A in an encrypted form (e.g., as a generated by an encryption component, not shown, included in access component 112). Further, application 152 can be configured to receive and store base time 1320A (e.g., in a memory 125B located on first device 150).

At (4)/1440, application 152 can be further configured to receive a request communication 1315A (e.g., in a series of communications 1315A-n between first device 150 and second device 160) from second device 160, wherein 1315A can comprise a request for use of the vehicle 102 by entity 103 for a particular requested duration of time RT. Request communication 1315A can be generated by application 162 in response to interaction with the second device 160 by entity 103 via an HMI 128C (operation of which can be as previously described with regard to HMI 128A-n presented in FIG. 1). In an embodiment, the request communication 1315A for access by second device 160 can also be initiated directly by first device 150. For example, entity 101 can be informed of entity 103's intent/interest in accessing vehicle 102, such that entity 101 can enter the request communication 1315A directly into application 152, e.g., via HMI 128B, without awaiting for the request from entity 103 to be entered into and transmitted from second device 160.

At (5)/1450, in response to the request communication 1315A being received and processed by application 152, application 152 can be further configured to, as previously described, generate and transmit an authentication key 170A, where the application 152 can be configured to transmit a first copy 170B of the authentication key 170A to second device 160/application 162 in combination with a copy 1320B of the base time 1320A, and further, transmit a second copy 170C of the authentication key 170A to access component 112. In a further embodiment, application 152 can be configured to, based on a duration of use of vehicle 102 by entity 103, generate a time period DT which can comprise of a start time ST and an end time ET. P, ST, and ET can be generated and transmitted to application 162 and the access component 112. In an embodiment, application 152 can utilize an offset time OT, such that in the event of the first device 150 and the access component 112 synchronized base time 1320A at midnight, but the second device 160 does not require access until 10 AM that morning, the offset time OT can be utilized to add the 10 hours to the base time 1320A to generate ST at 10 AM. Accordingly, the first device 150 and first application 152 has the base time 1320A (e.g., a timestamp), a first/original version of the authentication key 170A, DT, ST, and ET; the second device 160 and second application 162 has a copy 170B of the authentication key 170A, a copy 1320B of the base time 1320A, DT, ST, and ET; and the access component 112 has the original copy of base time 1320A, and a third copy 170C of the authentication key 170A, as well as DT, ST, and ET.

At (6)/1460, application 162 at second device 160 can generate an access request 1325A-n (e.g., comparable to access request 171A-n) and transmit the access request 1335A-n to the access component 112, wherein access request 1325A-n can include an authentication key 170X, in conjunction with base time 1320A, DT, ST, and ET. For the second device 160 to be granted access to the key interface 110, it is required that authentication key 170X comprises the second copy 170B of authentication key 170A, e.g., for a match to occur.

At (7)/1470, access component 112 can be configured to receive access request communication 1325A-n, authentication key 170X, base time 1320A, DT, ST, and ET. Access component 112 can be further configured to confirm that the received authentication key 170X is the second copy 170B of the authentication key 170A to match with the third copy 170C of the authentication key 170A received from the first device 150. At 1480, in response to a determination of YES the keys 170X and 170C match (e.g., key 170X comprises key 170B), process 1400 can advance to 1490, whereupon the access request communication 1325A can be approved by the access component 112. In response to a determination of NO, the keys 170X and 170C do not match (e.g., key 170X does not comprise key 170B), process 1400 can advance to 1485, wherein access component 112 can be configured to generate and transmit an access denied communication 1325D to second device 160, and further generate and transmit an access denied communication 1305D to first device 150 indicating the request 1325A by second device 160 was denied.

At (8)/1490, with access approved, access component 112 can be configured to generate and transmit granted communication 1305G to first device 150 indicating that access has been granted to second device 160, and further generate and transmit granted communication 1325G to second device 160 indicating the access has been granted.

At (9)/1495, access of second device 160 can be initiated, e.g., at time ST, with access component 112 monitoring access of the second device 160 in accordance with DT, ST, and ET.

At (10)/1497, upon reaching ET, and expiration of 1320A-n, access component 112 can be configured to terminate/revoke access of second device 160 to key interface 110. In an embodiment, at a defined notification time prior to ET, access component 112 can generate and transmit a notification 1325N to first device 150 and/or second device 160 indicating that access of second device 160 is to be revoked at ET, e.g., to enable any of entity 101 and/or 103 to conduct/make preparations to return vehicle 102.

Figure 15:
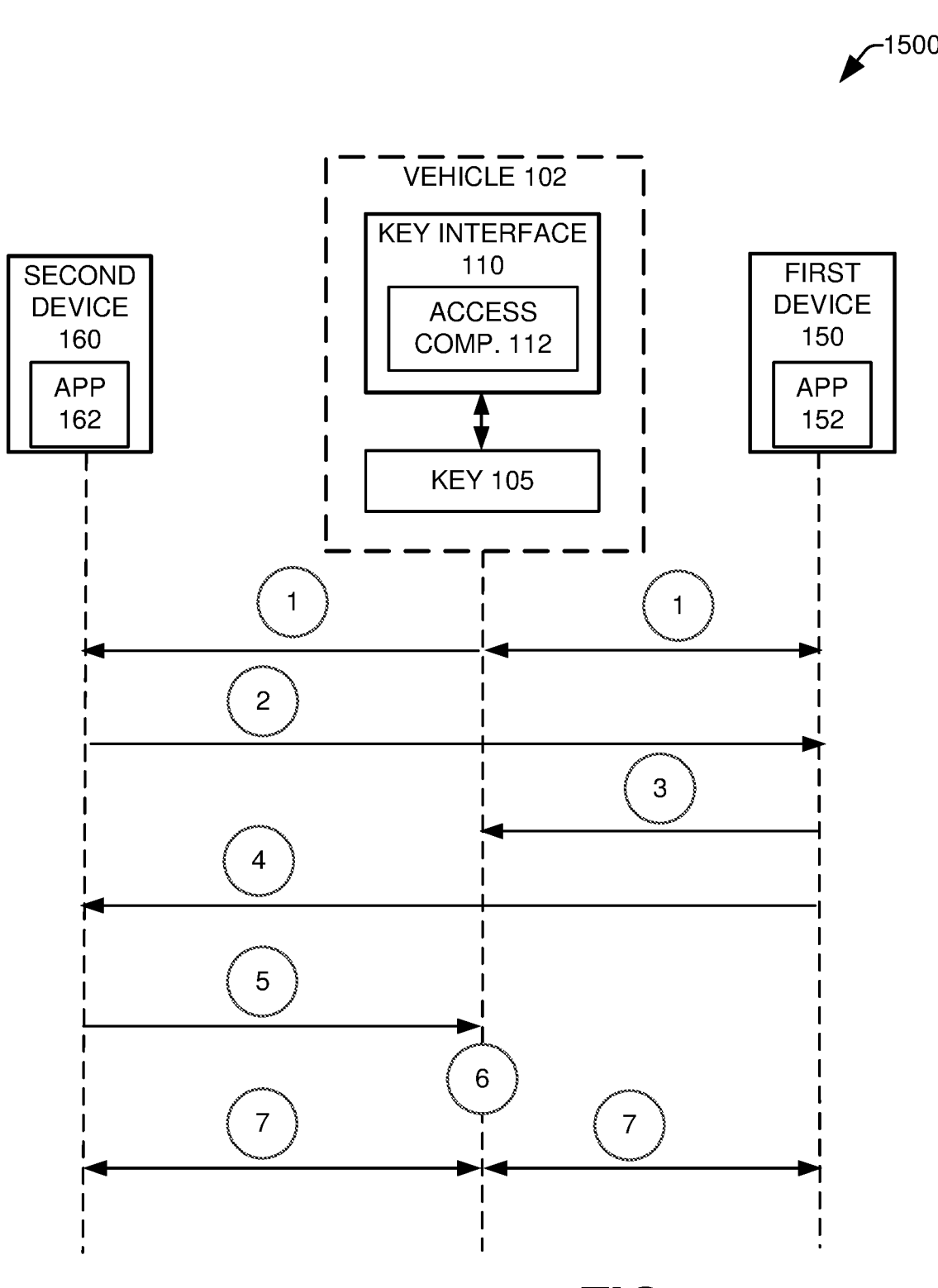
FIG. 15 presents a sequence diagram illustrating respective interactions and operations performed by any of a first device, a second device, and/or a key interface involving access to the key interface, in accordance with one or more embodiments presented herein.

FIG. 15 presents a sequence diagram 1500 illustrating respective interactions and operations performed by any of a first device, a second device, and/or a key interface involving access to the key interface, in accordance with an embodiment.

As shown in FIG. 15, three parties are involved: first device 150 (owner device), a key interface 110 (and access component 112), and a second device 160 (requesting device). In an embodiment, entity 103 operating second device 160 intends to establish temporary control/ownership of the vehicle 102, and thereby operate functions available at the key interface 110 and/or key 105.

As shown in FIG. 15, the peer-to-peer security protocol can comprise of a series of stages:

STAGE 1—synchronizing respective devices and components with a base time 1320A-n configured based on operation of a clock 1310 located on a vehicle 102 to be controlled/operated by the second device 160. Hence, a common time is established across the respective components/devices 110, 112, 150, 160, 180, etc., based on the time generated by local clock 1310.

STAGE 2: second device 160 can generate a request 1325A to access the key interface 110, wherein the request 1325A can be received by the first device 150.

STAGE 3: in response to receiving the request 1325A, first device 150 generates authentication keys 170A-n (and copies thereof) and timings ST, ET, DT, etc., for access component 112.

STAGE 4: the first device 150 can further generate a copy 170B of the authentication key 170A and timings ST, ET, DT, etc., for second device 160.

STAGE 5: access component 112 authenticates the authentication key 170X received from second device 160 with copy 170C of authentication key 170A received from first device 150. In the event of a match (e.g., key 170X is copy 170B which is a match with copy 170C), access of second device 160 to key interface 110 can be granted by access component 112. In the event of no match (e.g., key 170X is not copy 170B, and hence does not match with copy 170C), access of second device 160 to key interface 110 can be denied by access component 112.

STAGE 6: based on the previously mentioned match, access of the second device 160 to the key interface 110 can be initiated at time ST.

STAGE 7: access of the second device 160 to the key interface 110 is granted until time ET, whereupon access of the second device 160 to key interface 110 is revoked/terminated, e.g., by access component 112. While the duration of access through to ET can be controlled by access component 112, ET can also be monitored by first device 150, second device 160, and/or registration system 180 (not shown).

In an embodiment, STAGES 1-7 can be conducted using any communication process between the respective parties, e.g., using BLUETOOTH® or other suitable technology. Accordingly, per FIG. 15, STAGES 1-7 can be performed via short range communication technology, near-field technology, such as BLUETOOTH®, hence, no internet access is necessary by any of the devices. Per the foregoing, once STAGE 7 has been conducted and the second device 160 has verified ownership of the vehicle 102, the application 162 operating on the second device 160 can be granted access (e.g., by access component 112) to operate the key 105.

Figure 16:
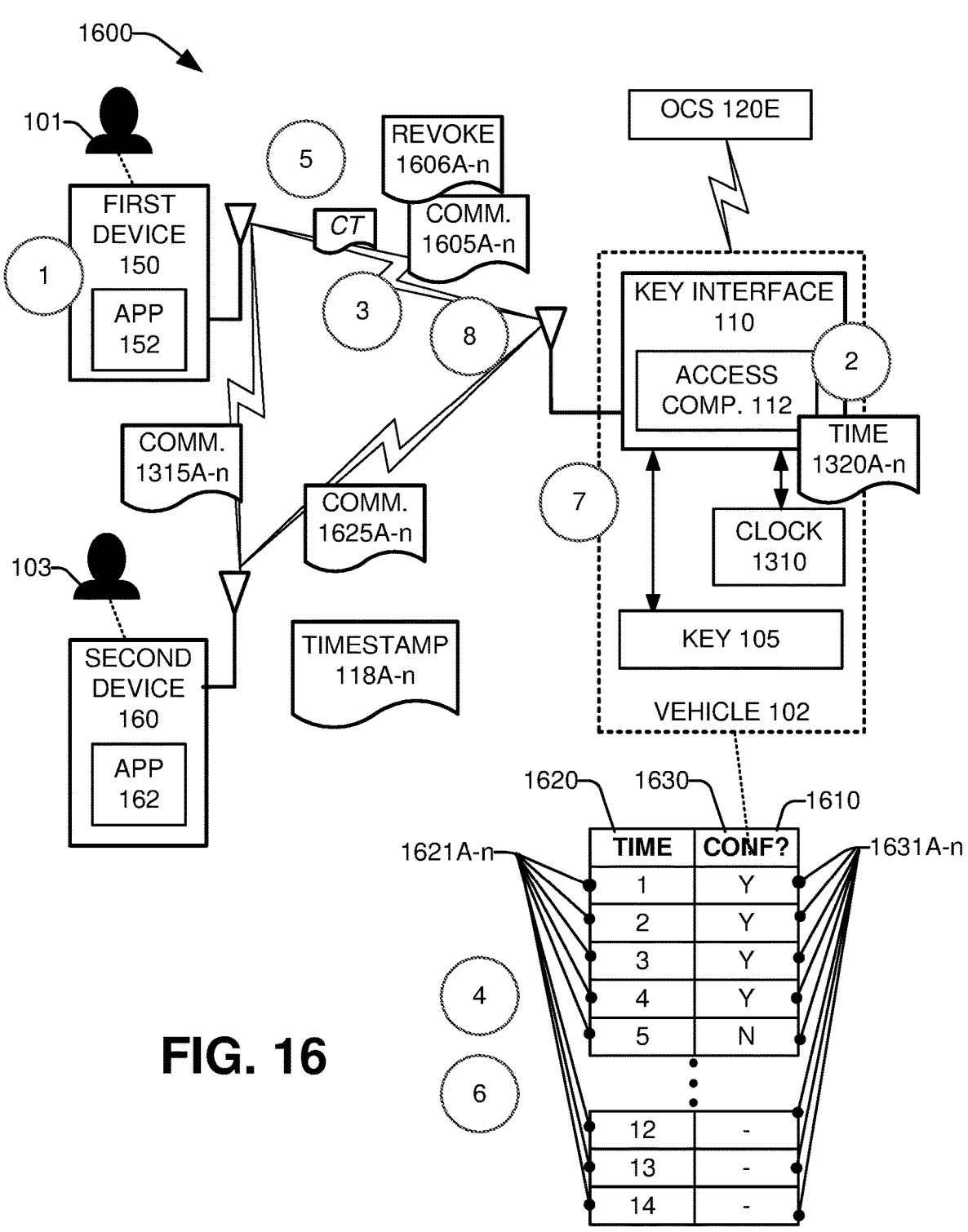
FIG. 16 presents a schematic illustrating use of a timed confirmation to control access of a vehicle by a device, in accordance with one or more embodiments presented herein.

FIG. 16, schematic 1600, illustrates use of a timed confirmation to control access of a vehicle by a device, in accordance with an embodiment. FIG. 17, process 1700 illustrates a computer-implemented process for enabling access based on receipt of a timed confirmation, in accordance with one or more embodiments. To aid understanding FIG. 16 and FIG. 17 can be read concurrently, such that an act or step in process 1700 can be identified in the system drawing 1600, accordingly, operations presented in FIG. 16 are referenced as (1)-(9) with corresponding acts/steps presented in FIG. 17 as 1710-1780. FIGS. 16 and 17 can be read such that the operations in FIGS. 9-15 have been undertaken and second device 160 has been granted access to the key interface 110, however, rather than deferring only to the duration of access based on ST and ET, the various embodiments presented in FIGS. 16-18 enable revocation of access of the second device 160 prior to ET being reached.

At (1)/1710, application 152 can be configured to generate and transmit at RPT a confirmation 1605A-n, wherein time RPT can be any suitable value, e.g., every 5 minutes, every hour, every day, every week, etc., at which a first device 150 should indicate that access of the key interface 110 by second device 160 is enabled/still enabled.

At (2)/1720, time RPT can be received and stored (e.g., in a local memory 125B) by access component 112, whereupon access component 112 can be configured to generate a confirmation table 1610 (further stored in local memory 125B). Confirmation table 1610 can be configured to comprise of a time column 1620 comprising respective time slots 1621A-n, and a confirmation column 1630 comprising respective access confirmation slots 1631A-n. In an example scenario, with a duration of access between ST and ET being 18 days, confirmation table 1610 can be generated by access component 112 comprising 18 access confirmation slots 1631A-n, wherein each slot is to be filled every 24 hours by a respective access confirmation 1605A-n.

At (3)/1730, in accordance with the period of time RPT, first application 152 can be configured to generate and transmit an access confirmation 1605A-n. Continuing the foregoing example, access confirmation 1605A-n can be generated and transmitted every 24 hours by first device 150.

At (4)/1740, access confirmation 1605A-n is received at access component 112, whereupon access component 112 is configured to populate the respective time slot 1621A-n and access confirmation slot 1631A-n in the confirmation column 1630 with the latest received access confirmation 1605A-n. Hence, slot 1631A is populated with access confirmation 1605A for time slot 1621A. Operations (3)/1730 and (4)/1740 can be repeated for each respective period of time, with access confirmation slots 1631A-n being populated with respective access confirmations 1605A-1 for respective time slots 1621A-n.

At (5)/1750, entity 101 can decide to revoke access of entity 103 to vehicle 102, and accordingly, can configure application 152 to not send an access confirmation 1605A-n for the next time slot 1621A-n. In an alternative embodiment, application 152 can be configured to generate and transmit a revoke access confirmation 1606X to populate the access confirmation slot 1631X for respective time slot 1621X.

At (6)/1760, (a) upon not receiving an access confirmation 1605A-n at the anticipated time 1621X, access component 112 can leave confirmation slot 1631X blank such that access of the second device 160 to the key interface 110 can be denied, or (b) upon receiving the revoke access confirmation 1606A-n at the anticipated time, access component 112 can populate the confirmation slot 1631X with the revoke access confirmation 1606A-n, whereupon access of the second device 160 can be denied.

At (7)/1770, in an embodiment, revocation of access of second device 160 can be initiated by access component 112, whereupon an access revoked notification 1625X can be generated and transmitted by the access component 112.

At (8)/1780 the revoked notification 1625X can be received at first device 150 and/or second device 160 indicating access of the second device 160 to vehicle 102 has been denied. In an embodiment, access can be denied immediately by access component 112, in another embodiment, access can be denied when operation of vehicle 102 is terminated, e.g., vehicle 102 is parked by entity 103, in another embodiment, operation of vehicle 102 can be terminated when vehicle 102 is at a particular location, and suchlike.

Figure 18:
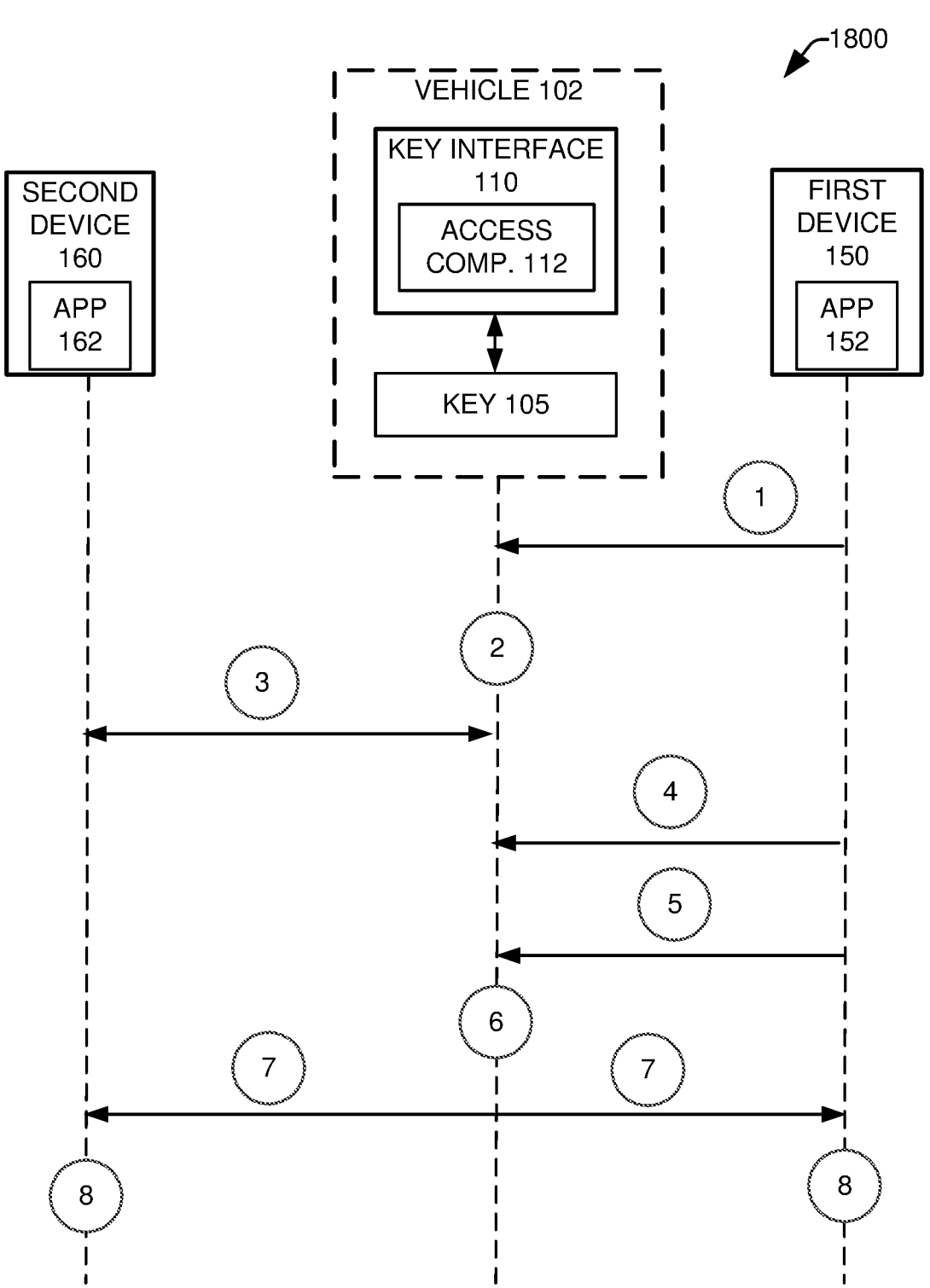
FIG. 18 presents a sequence diagram illustrating respective interactions and operations performed by any of a first device, a second device, and/or a key interface involving access to the key interface, in accordance with one or more embodiments presented herein.

FIG. 18 presents a sequence diagram 1800 illustrating respective interactions and operations performed by any of a first device, a second device, and/or a key interface involving access to the key interface, in accordance with an embodiment.

As shown in FIG. 18, three parties are involved: first device 150 (owner device), a key interface 110 (and access component 112), and a second device 160 (requesting device). In an embodiment, entity 103 operating second device 160 intends to establish temporary control/ownership of the vehicle 102, and thereby operate functions available at the key interface 110 and/or key 105.

STAGE 1: first device 150 can generate and transmit a time period (e.g., time RPT) at which a confirmation is to be received by the access component 112.

STAGE 2: in response to receiving timestamp 118A including RPT from first device 150, access component 112 can be configured to generate a confirmation table 1610 comprising a column 1620 of corresponding time slots 1621A-n, and a corresponding column 1630 of access confirmation slots 1631A-n. The respective time slots 1621A-n are based on RPT.

STAGE 3: access of second device 160 to key interface 110 can be granted/initiated, e.g., as a function of authenticating authentication keys 170A-n, as previously described.

STAGE 4: during the time period ST to ET set for access of second device 160 to key interface 110, first device 150 can generate access confirmations 1605A-n at the respective timings defined by RPT.

STAGE 5: at a particular time, entity 101, via first device 150, can deny access of vehicle 102 by the second device 160. As previously mentioned, either no confirmation 1605A-n is transmitted by first device 150 and/or an revoke access confirmation 1606A-n is transmitted.

STAGE 6: upon receiving the revoke access confirmation 1606A-n to populate confirmation table 1610 or not receiving a confirmation 1605A-n, access component 112 can deny access of the second device 160 to key interface 110.

STAGE 7: access component 112 can further generate and transmit access denied notifications 1625A-n to the first device 150 and/or second device 160.

STAGE 8: the denied notification 1625A-n can be respectively displayed on the first device 150 (e.g., via HMI 128B) or on the second device 160 (e.g., via HMI 128C) notifying respective entity 101 and/or 103 of the access revoked status of second device 160.

Figures 19A, 19B:
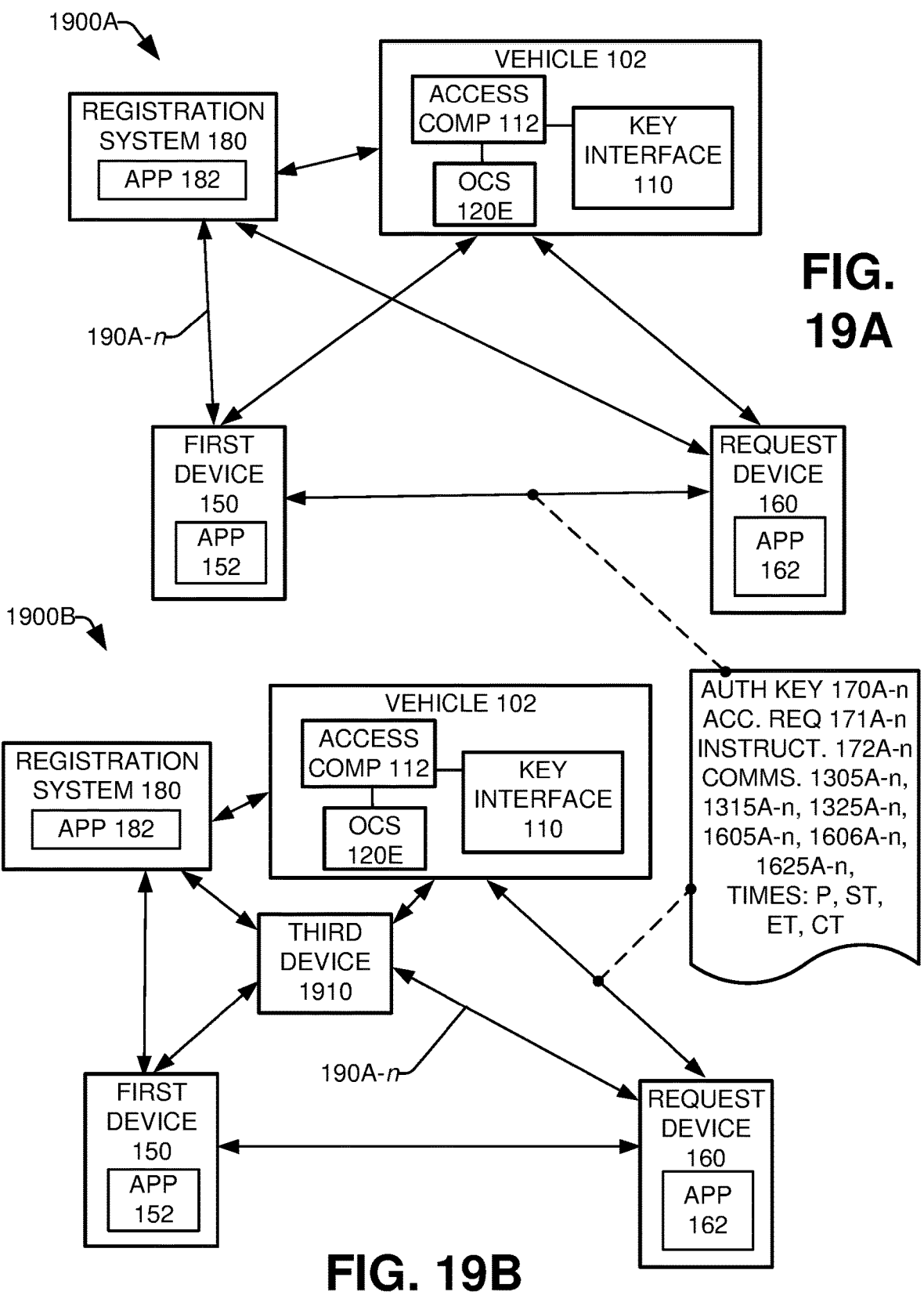
FIG. 19A illustrates communications being conducted between respective devices and systems, in accordance with one or more embodiments presented herein.
FIG. 19B illustrates communications being conducted between respective devices and systems utilizing an intermediary device/system, in accordance with one or more embodiments presented herein.

FIG. 19A, schematic 1900A illustrates an operational scenario of communications being conducted between respective systems and devices, in accordance with one or more embodiments. As shown, signals 190A-n can be transmitted/conducted between vehicle 102/access component 112, registration system 180, first device 150, and/or second device 160. As shown, communications 190A-n can comprise of any information/data presented in accordance with the one or more embodiments, herein, such as authentication keys 170A-n, access requests 171A-n, instructions 172A-n, information/data conveyed in signals 190A-n, communications 1305A-n, communications 1315A-n, communications 1325A-n, time 1320A-n, timestamps 118A-n, confirmation 1605A-n, revoke access confirmation 1606A-n, communication 1625A-n, and suchlike.

As previously mentioned, while the signals 190A-n can be transmitted/conducted via wireless technologies, the internet, 3G, 4G, 5G, and suchlike, signals 190A-n can also be conducted/transmitted using short-range communication technologies, such as short-wave radio technology, UWB, BLUETOOTH®, and suchlike, whereby any of vehicle 102/access component 112, registration system 180, first device 150, and/or second device 160 can be proximate to each other and hence do not require communication technologies such as 5G, internet-based communications, and suchlike.

FIG. 19B, schematic 1900B illustrates an operational scenario where communications are conducted via an intermediary device, in accordance with one or more embodiments. In an embodiment, a scenario can arise whereby any of vehicle 102/access component 112, registration system 180, first device 150, and/or second device 160 may no longer be respectively communicatively coupled to one or more of vehicle 102/access component 112, registration system 180, first device 150, and/or second device 160. However, a third device 1910 can be communicatively coupled to any of vehicle 102/access component 112, registration system 180, first device 150, and/or second device 160. Effectively, third device 1910 can function as an intermediate/intermediary device, acting as a go-between for any of vehicle 102/access component 112, registration system 180, first device 150, and/or second device 160. Accordingly, vehicle 102 can receive from, and transmit signals 190A-n to, the first device 150, second device 160, and/or registration system 180, via the third device 1910, such that the first device 150, second device 160, and/or registration system 180 is aware of one or more current operating conditions of vehicle 102, such as location of vehicle 102, destination of vehicle 102, velocity of vehicle 102, driving operation of vehicle 102, fuel/battery power available at vehicle 102, potential operating range of the vehicle 102 before next refueling/battery recharging, and suchlike. Information 1905A-n passed between vehicle 102/access component 112, first device 150, second device 160, and/or registration system 180 can be in any suitable form, e.g., encrypted format, unencrypted format, and suchlike.

Figure 20:
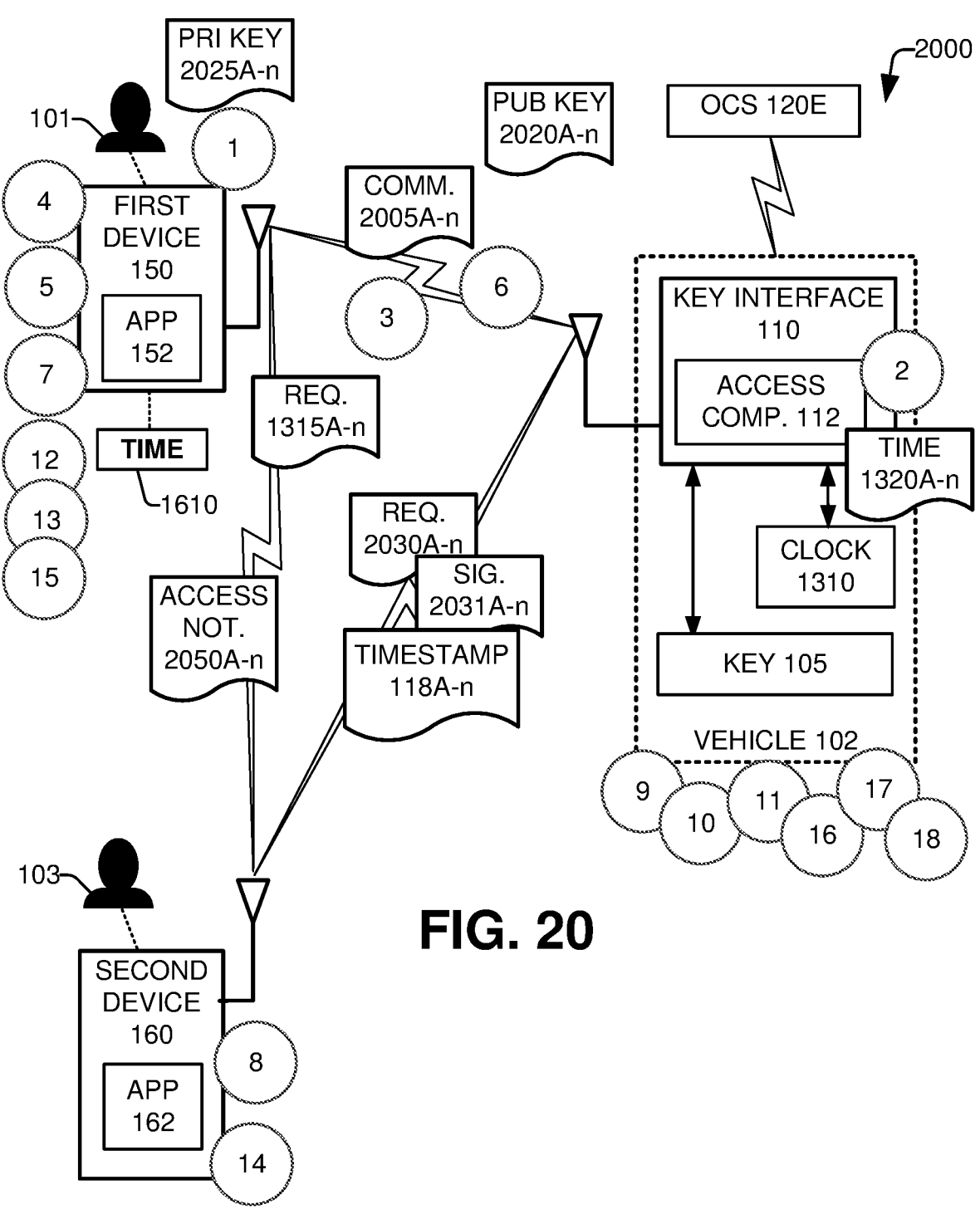
FIG. 20 presents a schematic illustrating use of cryptographic keys and signatures to control access of a vehicle by a device, in accordance with one or more embodiments presented herein.
Figure 21B:
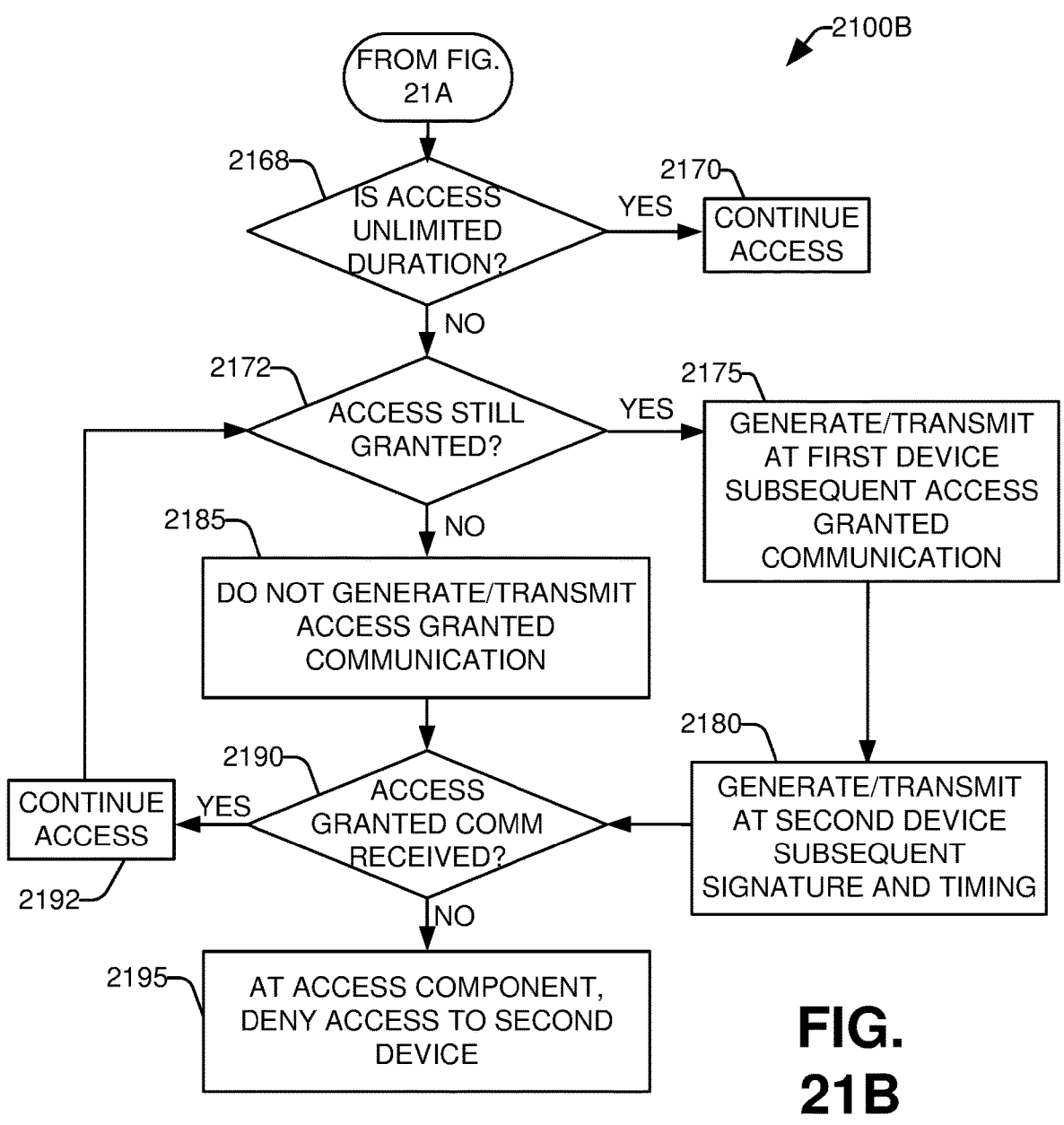

FIG. 20, schematic 2000, illustrates use of a user device controlling access of a vehicle by a requesting device, in accordance with an embodiment. FIGS. 21A and 21B, processes 2100A and 2100B illustrate a computer-implemented process for controlling access based on public and private cryptographic keys and signatures, in accordance with one or more embodiments. To aid understanding FIGS. 20, 21A, and 21B can be read concurrently, such that an act or step in processes 2100A and 2100B can be identified in the system drawing 2000, accordingly, operations presented in FIG. 20 are referenced as (1)-(18) with corresponding acts/steps presented in FIGS. 21A and 21B as 2110-2195. FIGS. 20, 21A, and 21B can be read such that any required operations in FIGS. 1-19B have been undertaken, e.g., applications 152 and 162 installed, timestamps 118A-n, etc., generated, and suchlike.

As previously mentioned, an example scenario of operation can involve an environment in which communication technologies such as 5G communications, interactions via a data server (e.g., registration system 180, a local server, a remote server) are not available, and suchlike. In an embodiment, advantage can be taken of those communication technologies enabling short-distance interaction between devices that are proximate to each other, such as short-wave radio communications, BLUETOOTH®, UWB, and suchlike.

As previously mentioned, various timestamps 118A-n can be utilized, wherein the timestamps 118A-n can be generated based on the base time 1320A-n generated by RTC 1310. Timestamps 118A-n can include ST, ET, UT, OT, RT, DT, RPT, etc.

At (1)/2110, the software application 152 on first device 150 can generate and transmit a communication 2005A (e.g., in a series of communications, notifications, requests, and suchlike) to the key interface 110 located on vehicle 102. Communication 2005A-n can be generated in response to interaction with the first device 150 by an entity 101 interacting with the first device 150 via an HMI 128B (operation of which can be as previously described with regard to HMIs 128A-n presented in FIG. 1).

In an embodiment, entity 101 can have an intent to allow entity 103, via second device 160, access to/operation of vehicle 102 for a defined period of time DT. Upon the defined period of time DT expiring, e.g., at ET, access to/operation of vehicle 102 by entity 103 is to be revoked/cancelled. In another embodiment, entity 101 can have an intent to enable entity 103 to have access to/operation of vehicle 102 for an unlimited period of time UT such that once an initial approval/access to key interface 110 has been established for second device 160, no further access authorization is required (unless entity 101 determines to subsequently revoke access by second device 160 to key interface 110).

Communication 2005A can comprise a request for the key interface 110/access component 112 to provide a time 1320A-n generated by a clock 1310 operating locally at vehicle 102.

At (2)/2115, access component 112 can be configured to receive the time request in communication 2005A, and in response thereto, access component 112 can be further configured to generate a time 1320A-n, wherein time 1320A (aka base time, synchronization time, calibration time) is the current time of the local clock 1310.

At (3)/2120, the access component 112 can be further configured to transmit the base time 1320A to the first device 150. Further, application 152 can be configured to receive and store base time 1320A (e.g., in a memory 125B located on first device 150).

At (4)/2125, first application 152 can be further configured to receive a request communication 1315A (e.g., in a series of communications 1315A-n between first device 150 and second device 160) from second device 160, wherein request communication 1315A can comprise a request for use of the vehicle 102 by entity 103, via second device 160, for a particular requested duration of time RT.

At (5)/2130, first application 152 can be configured to generate a duration of access DT for the second device 160, wherein DT can be based on RT requested by second device 160, whereby DT terminates at ET. In a further embodiment, during access of vehicle 102 in period DT, the first device 150 can be configured to generate, e.g., at a defined moment/period of time RPT, an access confirmation 2050A-n confirming the continued access of the second device 160 to the vehicle 102, e.g., until the duration of access DT for the second device 160 expires, the first device 150 revokes access of the second device 160 prior to the duration of access expiring. Alternatively, access of the key interface 110 by second device 160 can be granted for UT. First application 152 can further generate FDBT from the base time 1320A-n, wherein the FDBT and base time 1320A can be compared, e.g., by the access component 112 to determine that FDBT and base time 1320A are the same. In an embodiment, confirmation table 1610 (as previously described in FIG. 16) can be located at the first device 150, with the respective slots 1620 functioning to generate the timestamps 118A-n comprising the RPT parameters.

First application 152 can be further configured to generate a first public cryptographic key 2020A and a first private cryptographic key 2025A, wherein the public and private cryptographic keys 2020A and 2025A comprise/form a first pair of cryptographic keys (e.g., similar to authentication keys 170A-n). In an embodiment, the first public key 2020A can be shared with any other device (e.g., shared with access component 112) to which a second device (e.g., shared with the second device 160) that requires access to the access component 112.

At (6)/2135, the first public key 2020A can be transmitted from the first device 150 and stored at access component 112. The first public key 2020A is configured to be utilized by the access component 112 to confirm/authenticate/authorize an access request 2030A-n/signature 2031A-n received from the second device 160.

At (7)/2140, at the first device 150, a first signature 2031A can be generated from the first private key 2025A by the first application 152, and the first signature 2031A (e.g., similar to signatures 177A-n) can be transmitted from the first device 150 and stored at the second device 160. The first application 152 can further generate and transmit any of DT, ST, ET, FDBT, UT (in timestamps 118A-n) to the second device 160. DT can be a timestamp(s) 118A-n comprising ST at which the second device 160 is granted permission by the first device 150 to access the access component 112, and ET at which the access is to terminate, timestamp(s) 118A-n can comprise any of DT, ST, ET, FDBT, UT, etc., as required to control access of the key interface 110 by the second device 160.

At (8)/2145, the second device 160/application 162 can generate and transmit a first access request 2030A (e.g., comparable to comms. 1325A-n, 1625A-n), wherein the first access request 2030A is configured to request access of the access component 112. The first access request 2030A comprises the first signature 2031A generated by application 152 based on the first private key 2025A. Access request 2030A can further include any of the respective timestamp (s) 118A-n. Effectively, the second device 160 can function as a pass through device for the first signature 2031A between the first device 150 and the access component 112.

At (9)/2150, the access component 112 can be configured to determine whether to grant access of the second device 160 as a function of:
- a) authenticating the signature 2031A generated from the first private key 2025A matching the first public key 2020A, and
- b) where required, the first timestamp 118A either matches the base time 1320A provided by the access component 112 (e.g., at step (3)/2120) or the first timestamp 118A is subsequent to the base time 1320A provided by the access component 112. As previously mentioned, the first timestamp 118A is generated by the first application 152, based on the base time 1320A provided by the access component 112, and transmitted to the second device 160.

At (10)/2155, in response to a determination (e.g., by access component 112) that the signature 2031A does NOT match the first public key 2020A, process 2100A can advance to step 2160, whereupon the access component 112 can deny access of the key interface 110 by the second device 160. Further, in the event that the signature 2031A is determined (e.g., by access component 112) to match with the first public key 2020A, but the timestamp 118A-n (e.g., FDBT) is prior to the base time 1320A originally provided by the access component 112, the process 2100A can advance to step 2160, whereupon the second device 160 can be further denied access to the key interface 110 by the access component 112. An access denied notification 2005D can be generated by the access component 112 and further transmitted to the second device 160 and/or the first device 150 indicating the access request was denied, to facilitate further action by second application 162 and/or first application 152. For example (as indicated by the dashed connecting line), the second application 162 can be configured to communicate with the first application 152 to determine an issue with the base time 1320A, the first signature 2031A, the first public key 2020A, and suchlike, to enable access of the key interface 110 (where the second device 160 is authorized to do so).

At (10)/2155, in response to a determination by the access component 112 that YES, the signature 2031A-n matches the first public key 2020A and the timestamp 118A equals, or is subsequent to, the base time 1320A, process 2100A can advance to step 2165, whereupon the second device 160 can be granted access to control operation of the key interface 110 and key 105. At step 2165, process 2100A (e.g., FIG. 21A) can advance to process 2100B (e.g., FIG. 21B).

At (11)/2168, the access component 112 can make a further determination as to whether access of the key interface 110 by the second device 160 is of an unlimited duration UT or has a defined time DT/ET at which access is to expire/terminate. In response to a determination by access component 112 that, YES, access is unlimited, process 2100B can advance to step 2170, whereupon the second device 160 can be granted continued access to the key interface 110. In response to a determination by access component 112 that, NO, access is not unlimited, access is to be further controlled by the first device 110, process 2100B can advance to step (12)/2172.

At (12)/2172, periodically (e.g., at time RPT), the first application 152 on the first device 150, can determine whether access of the second device 160 to the key interface 110 is still granted. In an embodiment, e.g., unless (a) DT has expired, or (b) user 101 wants to revoke access of the second device 160 to the key interface 110, in response to a determination by the first application 152 that YES, the second device 160 can access the key interface 110, process 2100B can advance to step 2175.

At (13)/2175, the first application 152 can continue to generate and transmit access notifications 2050B-n to the second device 160. Each access notification 2050B-n can include a signature 2031B-n (e.g., a second signature, third signature, $n^{th}$ signature) generated from the first private key 2025A. At the required time RPT, the notification 2050B-n can be transmitted to the second device 160 in conjunction with an $n^{th}$ timestamp 118A-(n-1) for the respective time at which the respective $n^{th}$ access notification 2050B-n was generated, as well as either the first signature 2031A or a subsequently generated signature 2031B-n.

At (14)/2180, upon receipt of each instance of an access notification 2050B-n, the second application 162 can be configured to forward the signature 2031A-n and the $n^{th}$ timestamp 118n to the access component 112 for each respective signature 2013B-n and $n^{th}$ timestamp 118n to be authenticated against the first public key 2020A and base time 1320A/prior received timestamp 118A-(n-1) at the access component 112.

At (12)/2172, in the event of a determination by the first application 152 that the second device 160 is to NO longer be granted access to the key interface 110, process 2100B can advance to step (15)/2185, where first application 152 can be configured to either (a) not generate an access notification 2050B-n at the required time, or (b) generate an access notification 2050B-n indicating that access of second device 160 has been denied/terminated.

At (16)/2190, access component 112 can be configured to determine whether (a) an access request 2030 has been received from the second device 160, (b) the $n^{th}$ signature 2031B-n matches the first public key 2020A, and/or (c) the $n^{th}$ timestamp 118n is subsequent to a prior received timestamp 118A-(n-1). In response to a determination by access component 112, that YES, the required (a) access request 2030B-n has been received, (b) the $n^{th}$ signature 2031B-n matches the first public key 2020A and/or (c) the $n^{th}$ timestamp 118n is subsequent to a prior received timestamp 118A-(n-1), process 2100B can advance to (17)/2192, whereupon continued access of the key interface 110 can be granted to the second device 160, with process 2100B further returning to (12)/2172.

At (16)/2190, in response to a determination of NO, any of the required elements access request 2030B-n, 2031B-n, and/or timestamp 118B-n, were not received, process 2100B can advance to step (18)/2195, whereupon the access component 112 can be configured to deny access of the second device 160 to the key interface 110.

In an embodiment, the first device 150 can be configured to communicate (e.g., via communication 2005A-n) directly with the access component 112 and terminate access of the second device 160 to the key interface 110. Any suitable approach can be utilized to terminate the access, such as by cancelling the first public key 2020A at the access component 112, thereby removing the ability of the second device 160 to access the access component 112 based on the pairing of the first public key 2020A (received at the access component 112 from the first device 150) and the cryptographic signature 2031A (generated from the first private key 2025A at the first device 150) received at the access component 112 from the second device 160.

In another embodiment, the first device 150 can be configured to cease generation/communication of access notifications 2050A-n to the second device 160. Hence, at, or prior to, the moment that the second device 160 is to transmit an n$^{th}$ access request 2030A-n to the access component 112 to further access of the key interface 110 for the next period of time RPT, no n$^{th}$ signature 2031 has been received from the first device 150, rendering the second device 160 unable to generate an access request 2030A-n to the access component 112.

In a further embodiment, where the second device 160 is to be granted unlimited access UT, by the first device 150, to the access component 112, confirmation of the signature 2031A generated from the first private key 2025A can function to confirm and initiate access of the second device 160 to the access component 112.

It is to be appreciated that any confirmation device/means for confirmation can be utilized. For example, while either of signatures 2031A-n and/or timestamps 118A-n (e.g., generated from the base time 1320A-n) generated from RTC 1310 can be utilized as a confirmation device/means for confirmation, other confirmation processes can be utilized, e.g., a number, code, and suchlike, generated at either of the first device 150, the second device 160, and suchlike.

In an embodiment, first application 152 can be configured to generate a collection of public keys 2020A-n, and transmit copies of the respective public keys 2020A-n in the collection of public keys 2020A-n to the access component 112. Accordingly, as first application 152 receives requests from other devices (e.g., a third device 165, a fourth device 166, an n$^{th}$ device 167, and suchlike), access component 112 can generate and transmit respective signatures 2031A-n generated from private keys 2025A-n (e.g., at first device 150) to the respective other devices requesting access. Each private key 2025A-n can be paired with a public key 2020A-n, whereby each device can forward a signature 2031A-n from the respective private key 20025A-n to be paired with a public key at 2020A-n at the access component 112, and access can be granted based on the respective pairings.

Example Applications and Use

Figure 22:
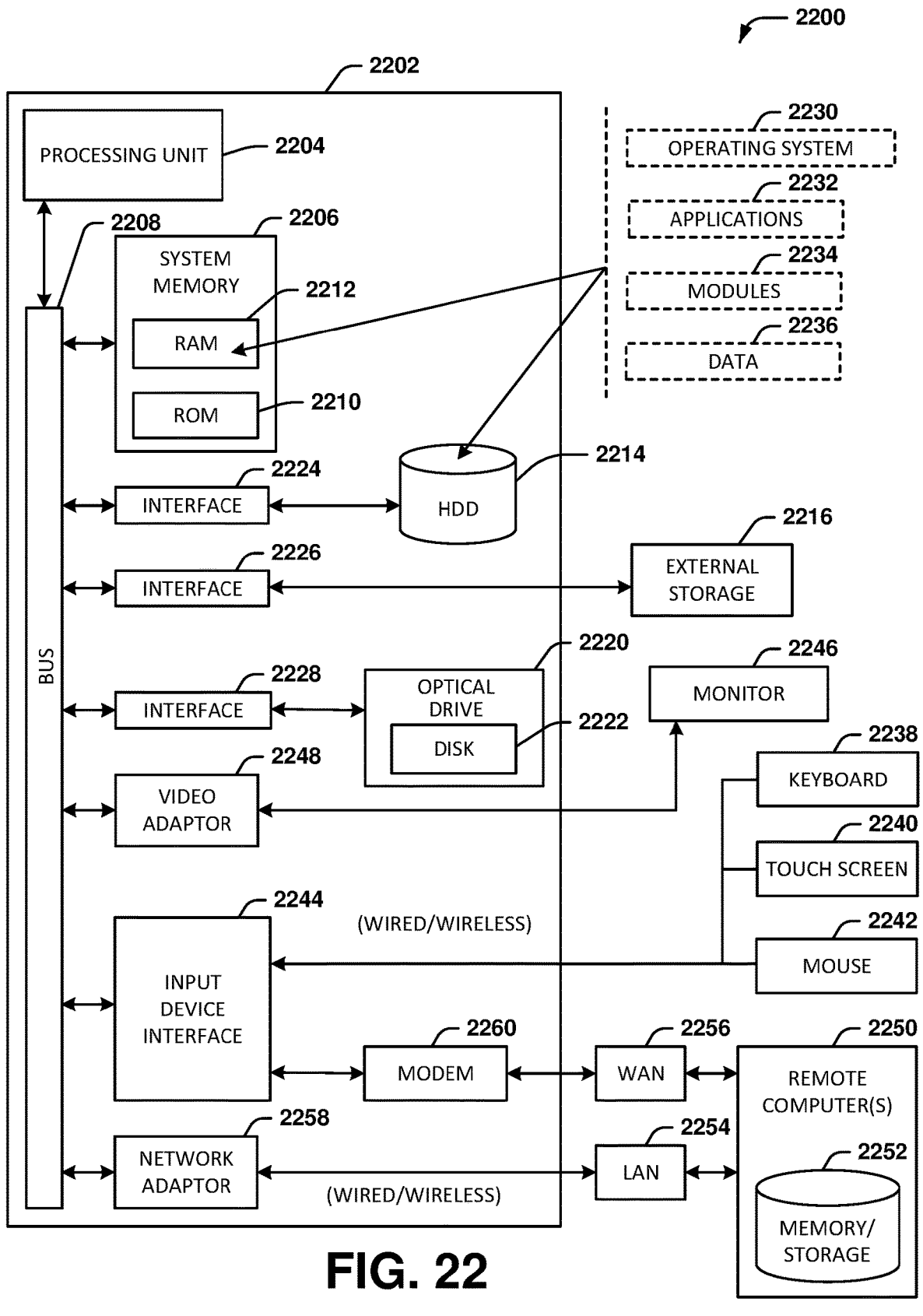
FIG. 22 depicts an example schematic block diagram of a computing environment with which the disclosed subject matter can interact/be implemented at least in part, in accordance with various aspects and implementations of the subject disclosure.
Figure 23:
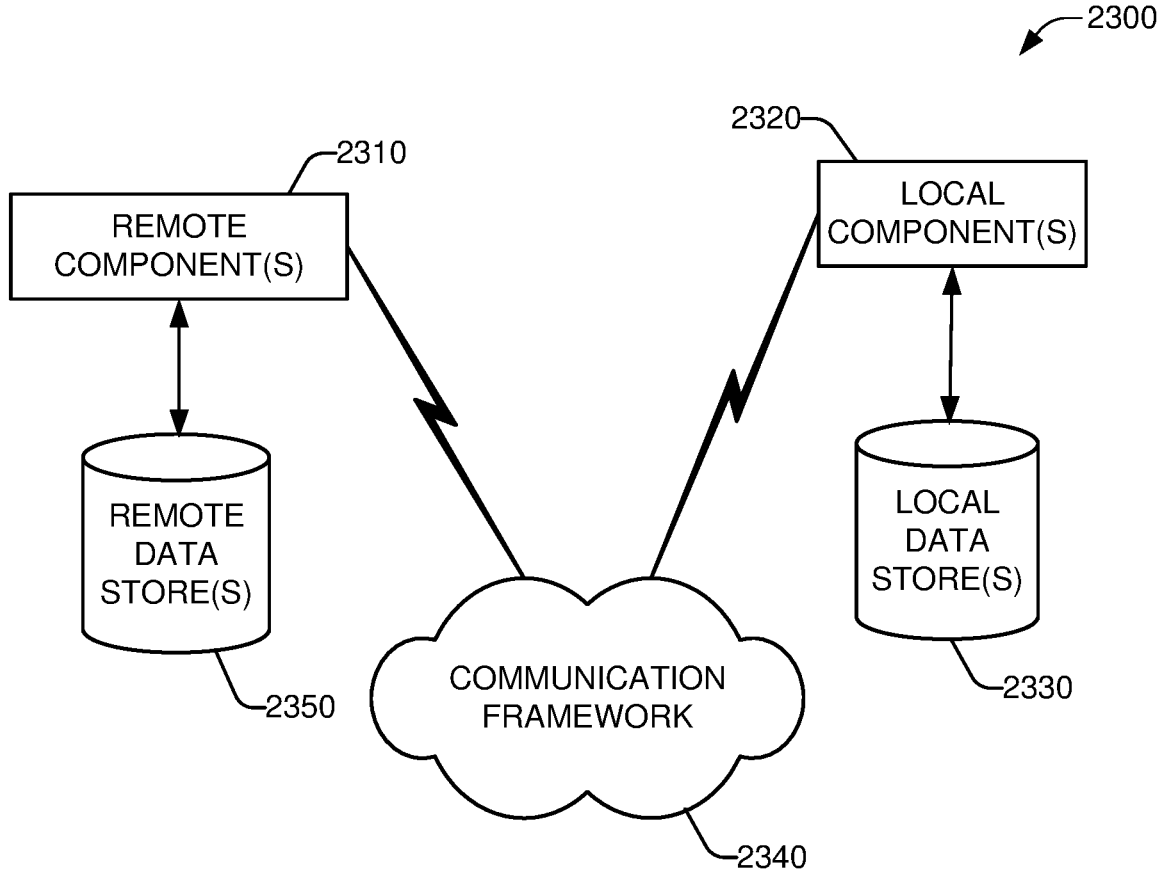
FIG. 23 is a block diagram representing an example computing environment into which aspects of the subject matter described herein may be incorporated.

Turning next to FIGS. 22 and 23, a detailed description is provided of additional context for the one or more embodiments described herein with FIGS. 1-21B.

In order to provide additional context for various embodiments described herein, FIG. 20 and the following discussion are intended to provide a brief, general description of a suitable computing environment 2200 in which the various embodiments described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, IoT devices, distributed computing systems, as well as personal computers, hand-held computing devices, microprocessor-based or programmable consumer electronics, and the like, each of which can be operatively coupled to one or more associated devices.

The embodiments illustrated herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 22, the example environment 2200 for implementing various embodiments of the aspects described herein includes a computer 2202, the computer 2202 including a processing unit 2204, a system memory 2206 and a system bus 2208. The system bus 2208 couples system components including, but not limited to, the system memory 2206 to the processing unit 2204. The processing unit 2204 can be any of various commercially available processors and may include a cache memory. Dual micro-processors and other multi-processor architectures can also be employed as the processing unit 2204.

The system bus 2208 can be any of several types of bus structure that can further interconnect to a memory bus (with or without a memory controller), a peripheral bus, and a local bus using any of a variety of commercially available bus architectures. The system memory 2206 includes ROM 2210 and RAM 2212. A basic input/output system (BIOS) can be stored in a non-volatile memory such as ROM, erasable programmable read only memory (EPROM), EEPROM, which BIOS contains the basic routines that help to transfer information between elements within the com-puter 2202, such as during startup. The RAM 2212 can also include a high-speed RAM such as static RAM for caching data.

The computer 2202 further includes an internal hard disk drive (HDD) 2214 (e.g., EIDE, SATA), one or more external storage devices 2216 (e.g., a magnetic floppy disk drive (FDD) 2216, a memory stick or flash drive reader, a memory card reader, etc.) and an optical disk drive 2220 (e.g., which can read or write from a CD-ROM disc, a DVD, a BD, etc.). While the internal HDD 2214 is illustrated as located within the computer 2202, the internal HDD 2214 can also be configured for external use in a suitable chassis (not shown). Additionally, while not shown in environment 2200, a solid-state drive (SSD) could be used in addition to, or in place of, an HDD 2214. The HDD 2214, external storage device(s) 2216 and optical disk drive 2220 can be connected to the system bus 2208 by an HDD interface 2224, an external storage interface 2226 and an optical drive interface 2228, respectively. The interface 2224 for external drive implementations can include at least one or both of Univer-sal Serial Bus (USB) and Institute of Electrical and Elec-tronics Engineers (IEEE) 1094 interface technologies. Other external drive connection technologies are within contem-plation of the embodiments described herein.

The drives and their associated computer-readable storage media provide nonvolatile storage of data, data structures, computer-executable instructions, and so forth. For the computer 2202, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 2212, including an operating system 2230, one or more application programs 2232, other program modules 2234 and program data 2236. All or portions of the operating system, applications, modules, and/or data can also be cached in the RAM 2212. The systems and methods described herein can be implemented utilizing various com-mercially available operating systems or combinations of operating systems.

Computer 2202 can optionally comprise emulation tech-nologies. For example, a hypervisor (not shown) or other intermediary can emulate a hardware environment for oper-ating system 2230, and the emulated hardware can option-ally be different from the hardware illustrated in FIG. 22. In such an embodiment, operating system 2230 can comprise one virtual machine (VM) of multiple VMs hosted at com-puter 2202. Furthermore, operating system 2230 can provide runtime environments, such as the Java runtime environ-ment or the .NET framework, for applications 2232. Run-time environments are consistent execution environments that allow applications 2232 to run on any operating system that includes the runtime environment. Similarly, operating system 2230 can support containers, and applications 2232 can be in the form of containers, which are lightweight, standalone, executable packages of software that include, e.g., code, runtime, system tools, system libraries and set-tings for an application.

Further, computer 2202 can comprise a security module, such as a trusted processing module (TPM). For instance with a TPM, boot components hash next in time boot components, and wait for a match of results to secured values, before loading a next boot component. This process can take place at any layer in the code execution stack of computer 2202, e.g., applied at the application execution level or at the operating system (OS) kernel level, thereby enabling security at any level of code execution.

A user can enter commands and information into the computer 2202 through one or more wired/wireless input devices, e.g., a keyboard 2238, a touch screen 2240, and a pointing device, such as a mouse 2242. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 2204 through an input device interface 2244 that can be coupled to the system bus 2008, but can be connected by other interfaces, such as a parallel port, an IEEE 1094 serial port, a game port, a USB port, an IR interface, a BLUETOOTH® interface, etc.

A monitor 2246 or other type of display device can be also connected to the system bus 2208 via an interface, such as a video adapter 2248. In addition to the monitor 2246, a computer typically includes other peripheral output devices (not shown), such as speakers, printers, etc.

The computer 2202 can operate in a networked environ-ment using logical connections via wired and/or wireless communications to one or more remote computers, such as a remote computer(s) 2250. The remote computer(s) 2250 can be a workstation, a server computer, a router, a personal computer, portable computer, microprocessor-based enter-tainment appliance, a peer device or other common network node, and typically includes many or all of the elements described relative to the computer 2202, although, for pur-poses of brevity, only a memory/storage device 2252 is illustrated. The logical connections depicted include wired/ wireless connectivity to a local area network (LAN) 2254 and/or larger networks, e.g., a wide area network (WAN) 2256. Such LAN and WAN networking environments are commonplace in offices and companies, and facilitate enterprise-wide computer networks, such as intranets, all of which can connect to a global communications network, e.g., the internet.

When used in a LAN networking environment, the computer 2202 can be connected to the local network 2254 through a wired and/or wireless communication network interface or adapter 2258. The adapter 2258 can facilitate wired or wireless communication to the LAN 2254, which can also include a wireless access point (AP) disposed thereon for communicating with the adapter 2258 in a wireless mode.

When used in a WAN networking environment, the computer 2202 can include a modem 2260 or can be connected to a communications server on the WAN 2256 via other means for establishing communications over the WAN 2256, such as by way of the internet. The modem 2260, which can be internal or external and a wired or wireless device, can be connected to the system bus 2208 via the input device interface 2244. In a networked environment, program modules depicted relative to the computer 2202 or portions thereof, can be stored in the remote memory/storage device 2252. It will be appreciated that the network connections shown are example and other means of establishing a communications link between the computers can be used.

When used in either a LAN or WAN networking environment, the computer 2202 can access cloud storage systems or other network-based storage systems in addition to, or in place of, external storage devices 2216 as described above. Generally, a connection between the computer 2202 and a cloud storage system can be established over a LAN 2254 or WAN 2256 e.g., by the adapter 2258 or modem 2260, respectively. Upon connecting the computer 2202 to an associated cloud storage system, the external storage interface 2226 can, with the aid of the adapter 2258 and/or modem 2260, manage storage provided by the cloud storage system as it would other types of external storage. For instance, the external storage interface 2226 can be configured to provide access to cloud storage sources as if those sources were physically connected to the computer 2202.

The computer 2202 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

Referring now to details of one or more elements illustrated at FIG. 23, an illustrative cloud computing environment 2300 is depicted. FIG. 23 is a schematic block diagram of a computing environment 2300 with which the disclosed subject matter can interact. The system 2300 comprises one or more remote component(s) 2310. The remote component(s) 2310 can be hardware and/or software (e.g., threads, processes, computing devices). In some embodiments, remote component(s) 2310 can be a distributed computer system, connected to a local automatic scaling component and/or programs that use the resources of a distributed computer system, via communication framework 2340. Communication framework 2340 can comprise wired network devices, wireless network devices, mobile devices, wearable devices, radio access network devices, gateway devices, femtocell devices, servers, etc.

The system 2300 also comprises one or more local component(s) 2320. The local component(s) 2320 can be hardware and/or software (e.g., threads, processes, computing devices). In some embodiments, local component(s) 2320 can comprise an automatic scaling component and/or programs that communicate/use the remote resources 2310 and 2320, etc., connected to a remotely located distributed computing system via communication framework 2340.

One possible communication between a remote component(s) 2310 and a local component(s) 2320 can be in the form of a data packet adapted to be transmitted between two or more computer processes. Another possible communication between a remote component(s) 2310 and a local component(s) 2320 can be in the form of circuit-switched data adapted to be transmitted between two or more computer processes in radio time slots. The system 2300 comprises a communication framework 2340 that can be employed to facilitate communications between the remote component(s) 2310 and the local component(s) 2320, and can comprise an air interface, e.g., Uu interface of a UMTS network, via a long-term evolution (LTE) network, etc. Remote component(s) 2310 can be operably connected to one or more remote data store(s) 2350, such as a hard drive, solid state drive, SIM card, device memory, etc., that can be employed to store information on the remote component(s) 2310 side of communication framework 2340. Similarly, local component(s) 2320 can be operably connected to one or more local data store(s) 2330, that can be employed to store information on the local component(s) 2320 side of communication framework 2340.

With regard to the various functions performed by the above described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

The term "facilitate" as used herein is in the context of a system, device or component "facilitating" one or more actions or operations, in respect of the nature of complex computing environments in which multiple components and/or multiple devices can be involved in some computing operations. Non-limiting examples of actions that may or may not involve multiple components and/or multiple devices comprise transmitting or receiving data, establishing a connection between devices, determining intermediate results toward obtaining a result, etc. In this regard, a computing device or component can facilitate an operation by playing any part in accomplishing the operation. When operations of a component are described herein, it is thus to be understood that where the operations are described as facilitated by the component, the operations can be optionally completed with the cooperation of one or more other computing devices or components, such as, but not limited to, sensors, antennae, audio and/or visual output devices, other devices, etc.

Further, the various embodiments can be implemented as a method, apparatus or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Moreover, terms such as "mobile device equipment," "mobile station," "mobile," "subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," "BS transceiver," "BS device," "cell site," "cell site device," "gNode B (gNB)," "evolved Node B (eNode B, eNB)," "home Node B (HNB)" and the like, refer to wireless network components or appliances that transmit and/or receive data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "client entity," "consumer," "client entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

It should be noted that although various aspects and embodiments are described herein in the context of 5G or other next generation networks, the disclosed aspects are not limited to a 5G implementation, and can be applied in other network next generation implementations, such as sixth generation (6G), or other wireless systems. In this regard, aspects or features of the disclosed embodiments can be exploited in substantially any wireless communication technology. Such wireless communication technologies can include universal mobile telecommunications system (UMTS), global system for mobile communication (GSM), code division multiple access (CDMA), wideband CDMA (WCMDA), CDMA2000, time division multiple access (TDMA), frequency division multiple access (FDMA), multi-carrier CDMA (MC-CDMA), single-carrier CDMA (SC-CDMA), single-carrier FDMA (SC-FDMA), orthogonal frequency division multiplexing (OFDM), discrete Fourier transform spread OFDM (DFT-spread OFDM), filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM (CP-OFDM), resource-block-filtered OFDM, wireless fidelity (Wi-Fi), worldwide interoperability for microwave access (WiMAX), wireless local area network (WLAN), general packet radio service (GPRS), enhanced GPRS, third generation partnership project (3GPP), long term evolution (LTE), 5G, third generation partnership project 2 (3GPP2), ultra-mobile broadband (UMB), high speed packet access (HSPA), evolved high speed packet access (HSPA+), high-speed downlink packet access (HSDPA), high-speed uplink packet access (HSUPA), Zigbee, or another institute of electrical and electronics engineers (IEEE) 802.12 technology.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

While not an exhaustive listing, the following provides an overview of various embodiments, but not all embodiments, presented herein:

Clause 1: A system located on a vehicle, comprising: a memory that stores computer executable components; and a processor that executes the computer executable components stored in the memory, wherein the computer executable components comprise: a key interface configured to control at least one operation of the vehicle; and an access component configured to control operation of the key interface, and further configured to: receive a synchronization request from a first device; access a real-time clock co-located onboard the vehicle; determine, in response to the synchronization request, a base time from a current state of the real-time clock; and transmit the base time to the first device, wherein the base time is utilized to control access of a second device to the key interface.

Clause 2: The system of any preceding clause, wherein the access component is further configured to: receive an access request from the second device, wherein the access request includes a timestamp, the timestamp is generated by the first device based on the base time generated by the access component prior to generation of the timestamp; and in response to a determination that the timestamp has a value that is the same or subsequent to the base time, provisionally grant access of the second device to the key interface.

Clause 3: The system of any preceding clause, wherein the access component is further configured to: in response to a determination that the timestamp has a value that is not the same or subsequent to the base time, deny access of the second device to the key interface.

Clause 4: The system of any preceding clause, wherein the access component is further configured to: receive, from the first device, a public cryptographic key; receive, from the second device, a digital signature further included in the access request; determine whether the digital signature is paired with the public cryptographic key; and in response to a determination that the digital signature is paired with the public cryptographic key and the value of the timestamp is the same or subsequent to the base time, grant access of the second device to the key interface; and in response to a determination that the digital signature is not paired with the public cryptographic key, deny access of the second device to the key interface.

Clause 5: The system of any preceding clause, wherein the digital signature is forwarded by the second device based on a private cryptographic key, wherein the private cryptographic key is generated by the first device based on the public cryptographic key, and the signature is generated by the first device based on the private cryptographic key.

Clause 6: The system of any preceding clause, wherein communication between at least one of the first device and the access component is via short range wireless communication technology, or the second device and the access component is via short range wireless communication technology.

Clause 7: The system of any preceding clause, wherein the key interface is configured to control operation of a physical key located on the vehicle, wherein the physical key is a smart key.

Clause 8: The system of any preceding clause, wherein the physical key is configured to perform at least one of unlock a door on the vehicle, lock a door on the vehicle, start an engine located on board the vehicle, stop operation of an engine located on board the vehicle, unlock a tailgate to access a trunk on the vehicle, or lock a trunk tailgate on the vehicle.

Clause 9: The system of any preceding clause, wherein at least one of the first device or the second device is one of a smartphone, a mobile phone, a cellphone, a personal digital assistant (PDA), a handheld computing device, a smartwatch, a tablet computer, or a laptop computer.

Clause 10: A computer-implemented method, comprising: receiving, by a local device comprising a processor, a first communication from a first device including a synchronization request from the first device, wherein the local device is located on a vehicle configured to control access to a key interface located on the vehicle, and the first device is located remote from the vehicle; accessing, by the local device, a real-time clock co-located onboard the vehicle; determining, by the local device, in response to the synchronization request, a base time from a current state of the real-time clock; and transmitting, by the first device, the base time to the first device, wherein the base time is utilized to control access of the key interface by a second device.

Clause 11: The computer-implemented method of any preceding clause, further comprising: receiving, by the local device, an access request from the second device, wherein the access request includes a timestamp, the timestamp is generated by the first device based on the base time; determining, by the local device, that the timestamp has a value that is the same or subsequent to the base time; and in response to a determination that the timestamp has a value that is the same or subsequent to the base time, provisionally granting, by the local device, access of the key interface by the second device; or in response to a determination that the timestamp has a value that is not the same or subsequent to the base time, denying, by the local device, access of the second device to the key interface.

Clause 12: The computer-implemented method of any preceding clause, further comprising: receiving, by the local device, a public cryptographic key generated by the first device; receiving, by the local device, a digital signature further included in the access request from the second device; determining, by the local device, whether the digital signature is paired with the public cryptographic key; and in response to a determination that the digital signature is paired with the public cryptographic key and the value of the timestamp is the same or subsequent to the base time, granting, by the local device, access of the second device to the key interface; and in response to a determination that the digital signature is not paired with the public cryptographic key, denying, by the local device, access of the second device to the key interface.

Clause 13: The computer-implemented method of any preceding clause, wherein the digital signature is forwarded by the second device based on a private cryptographic key, wherein the private cryptographic key is generated by the first device based on the public cryptographic key, and the digital signature is generated by the first device based on the private cryptographic key.

Clause 14: The computer-implemented method of any preceding clause, wherein communication between at least one of the local device and the first device is via short range wireless communication technology, or the local device and the second device is via short range wireless communication technology.

Clause 15: The computer-implemented method of any preceding clause, wherein the key interface is configured to control operation of a physical key located on a vehicle, wherein the physical key is configured to perform at least one of unlock a door on the vehicle, lock a door on the vehicle, start an engine located on board the vehicle, stop operation of an engine located on board the vehicle, unlock a tailgate to access a trunk on the vehicle, or lock a trunk tailgate on the vehicle.

Clause 16: The computer-implemented method of any preceding clause, wherein at least one of the first device or the second device is one of a smartphone, a mobile phone, a cellphone, a personal digital assistant (PDA), a handheld computing device, a smartwatch, a tablet computer, or a laptop computer.

Clause 17: A computer program product stored on a non-transitory computer-readable medium and comprising machine-executable instructions, wherein, in response to being executed, the machine-executable instructions cause computing equipment to perform operations, comprising: receiving a first communication from a first device, a synchronization request from a first device, wherein the local device is located on a vehicle configured to control access to a key interface located on the vehicle, and the first device is located remote from the vehicle; accessing a real-time clock co-located onboard the vehicle; determining in response to the synchronization request, a base time from a current state of the real-time clock; and transmitting the base time to the first device, wherein the base time is utilized to control access of the key interface by a second device.

Clause 18: The computer program product according to any preceding clause, the operations further comprising: receiving an access request from the second device, wherein the access request includes a timestamp, the timestamp is generated by the first device based on the base time; determining that the timestamp has a value that is the same or subsequent to the base time; and in response to a determination that the timestamp has a value that is the same or subsequent to the base time, provisionally granting access of the key interface by the second device; or in response to a determination that the timestamp has a value that is not the same or subsequent to the base time, denying access of the second device to the key interface.

Clause 19: The computer program product according to any preceding clause, further comprising: receiving a public cryptographic key generated by the first device; receiving a digital signature further included in the access request from the second device, wherein the digital signature is forwarded by the second device based on a private cryptographic key, wherein the private cryptographic key is generated by the first device based on the public cryptographic key, and the signature is generated by the first device based on the private cryptographic key; determining whether the digital signature is paired with the public cryptographic key; and in response to a determination that the digital signature is paired with the public cryptographic key and the value of the timestamp is the same or subsequent to the base time, granting access of the second device to the key interface; and in response to a determination that the digital signature is not paired with the public cryptographic key, denying access of the second device to the key interface.

Clause 20: The computer program product according to any preceding clause, wherein communication between at least one of the computing equipment and the first device is via short range wireless communication technology, or between the computing equipment and the second device is via short range wireless communication technology.

In various cases, any suitable combination of clauses 1-9 can be implemented.

In various cases, any suitable combination of clauses 10-16 can be implemented.

In various cases, any suitable combination of clauses 17-20 can be implemented.

What is claimed is:

1. A system located on a vehicle, comprising:

a key interface configured to control at least one operation of the vehicle;

a memory that stores computer executable components; and a processor that executes at least one of the computer executable components that:

receives a synchronization request from a first device associated with a first user that is authorized to grant access to the key interface, wherein the first device is not part of the vehicle;

accesses a real-time clock located onboard the vehicle;

determines, in response to the synchronization request, a base time from a current state of the real-time clock; and transmits the base time to the first device, wherein the base time is utilized to control access of a second device to the key interface, wherein the second device is associated with a second user that wants access to the key interface, and wherein the second device is not part of the vehicle;

receives, from the first device, a public cryptographic key associated with granting access to the key interface, a start time for granting the access to the key interface based on the public cryptographic key, and an end time for ending the granted access to the key interface based on the public cryptographic key;

receives, from the second device, an access request comprising a digital signature;

determines whether the second device is permitted to access the key interface, comprising:

in response to determining that the digital signature is paired with the public cryptographic key, and a current time of the real-time clock is between the start time and end time, grant access of the second device to the key interface; and in response to determining that at least one of the digital signature is not paired with the public cryptographic key or the current time is not between the start time and end time, deny access of the second device to the key interface.

2. The system of claim 1, wherein the at least one of the computer executable components:

receive, from the first device, a defined periodicity for reauthenticating access of the second device to the key interface between the start time and end time; and in response to having granted access of the second device to the key interface, and not receiving, from the first device, a reauthentication message within the defined periodicity, revoking access of the second device to the key interface.

3. The system of claim 1, wherein the private cryptographic key is generated by the first device based on the public cryptographic key, wherein the digital signature is generated by the first device based on the private cryptographic key, and wherein the first device transmits the digital signature to the second device.

4. The system of claim 1, wherein communication between the first device and the system is via short range wireless communication technology.

5. The system of claim 1, wherein the key interface is configured to control operation of a physical key located on the vehicle, wherein the physical key is a smart key.

6. The system of claim 5, wherein the physical key is configured to perform at least one of unlock a door on the vehicle, lock the door on the vehicle, start an engine located on board the vehicle, stop operation of the engine located on board the vehicle, unlock a tailgate on the vehicle, or lock the tailgate on the vehicle.

7. The system of claim 1, wherein at least one of the first device or the second device is one of a smartphone, a mobile phone, a cellphone, a personal digital assistant (PDA), a handheld computing device, a smartwatch, a tablet computer, or a laptop computer.

8. A computer-implemented method, comprising:

receiving, by a system of a vehicle, a synchronization request from a first device associated with a first user that is authorized to grant access to the key interface, wherein the first device is not part of the vehicle, and wherein the vehicle comprises a key interface configured to control at least one operation of the vehicle;

accessing, by the system, a real-time clock located onboard the vehicle;

determining, by the system, in response to the synchronization request, a base time from a current state of the real-time clock;

transmitting, by the system, the base time to the first device, wherein the base time is utilized to control access of the key interface by a second device, wherein the second device is associated with a second user that wants access to the key interface, and wherein the second device is not part of the vehicle;

receiving, by the system, from the first device, a public cryptographic key associated with granting access to the key interface, a start time for granting the access to the key interface based on the public cryptographic key, and an end time for ending the granted access to the key interface based on the public cryptographic key;

receiving, by the system, from the second device, an access request comprising a digital signature;

determining, by the system, whether the second device is permitted to access the key interface, comprising:

in response to determining that the digital signature is paired with the public cryptographic key, and a current time of the real-time clock is between the start time and end time, grant access of the second device to the key interface; and in response to determining that at least one of the digital signature is not paired with the public cryptographic key or the current time is not between the start time and end time, deny access of the second device to the key interface.

9. The computer-implemented method of claim 8, further comprising:

receiving, by the system, from the first device, a defined periodicity for reauthenticating access of the second device to the key interface between the start time and end time; and in response to having granted access of the second device to the key interface, and not receiving a reauthentication message within the defined periodicity, revoking, by the system, access of the second device to the key interface.

10. The computer-implemented method of claim 8, wherein the private cryptographic key is generated by the first device based on the public cryptographic key, wherein the digital signature is generated by the first device based on the private cryptographic key, and wherein the first device transmits the digital signature to the second device.

11. The computer-implemented method of claim 8, wherein communication between the system and the first device is via short range wireless communication technology.

12. The computer-implemented method of claim 8, wherein the key interface is configured to control operation of a physical key located on a vehicle, and wherein the physical key is configured to perform at least one of unlock a door on the vehicle, lock the door on the vehicle, start an engine located on board the vehicle, stop operation of the engine located on board the vehicle, unlock a tailgate on the vehicle, or lock the tailgate on the vehicle.

13. The computer-implemented method of claim 8, wherein at least one of the first device or the second device is one of a smartphone, a mobile phone, a cellphone, a personal digital assistant (PDA), a handheld computing device, a smartwatch, a tablet computer, or a laptop computer.

14. A computer program product stored on a non-transitory computer-readable medium and comprising machine-executable instructions, wherein, in response to being executed, the machine-executable instructions cause computing equipment of a vehicle to perform operations, comprising:

receiving a synchronization request from a first device associated with a first user that is authorized to grant access to the key interface, wherein the first device is not part of the vehicle, and wherein the vehicle comprises a key interface configured to control at least one operation of the vehicle;

accessing a real-time clock located onboard the vehicle;

determining in response to the synchronization request, a base time from a current state of the real-time clock;

transmitting the base time to the first device, wherein the base time is utilized to control access of the key interface by a second device, wherein the second device is associated with a second user that wants access to the key interface, and wherein the second device is not part of the vehicle;

receiving, from the first device, a public cryptographic key associated with granting access to the key interface, a start time for granting the access to the key interface based on the public cryptographic key, and an end time for ending the granted access to the key interface based on the public cryptographic key;

receiving, from the second device, an access request comprising a digital signature;

determining, by the system, whether the second device is permitted to access the key interface, comprising:

in response to determining that the digital signature is paired with the public cryptographic key, and a current time of the real-time clock is between the start time and end time, grant access of the second device to the key interface; and in response to determining that at least one of the digital signature is not paired with the public cryptographic key or the current time is not between the start time and end time, deny access of the second device to the key interface.

15. The computer program product according to claim 14, further comprising: receiving from the first device, a defined periodicity for reauthenticating access of the second device to the key interface between the start time and end time; and in response to having granted access of the second device to the key interface, and not receiving a reauthentication message within the defined periodicity, revoking, by the system, access of the second device to the key interface.

16. The computer program product according to claim 14, wherein communication between the computing equipment and the first device is via short range wireless communication technology.

17. The computer program product according to claim 14, wherein communication the second device and the system is via short range wireless communication technology.

18. The computer program product according to claim 14, wherein the private cryptographic key is generated by the first device based on the public cryptographic key, wherein the digital signature is generated by the first device based on the private cryptographic key, and wherein the first device transmits the digital signature to the second device.

19. The computer program product according to claim 14, wherein the key interface is configured to control operation of a physical key located on a vehicle.

20. The computer program product according to claim 14, wherein at least one of the first device or the second device is one of a smartphone, a mobile phone, a cellphone, a personal digital assistant (PDA), a handheld computing device, a smartwatch, a tablet computer, or a laptop computer.

\* \* \* \* \*